(12) United States Patent
Tanaka et al.

(10) Patent No.: US 11,780,448 B2
(45) Date of Patent: Oct. 10, 2023

(54) VEHICLE BEHAVIOR ESTIMATION METHOD, VEHICLE CONTROL METHOD, AND VEHICLE BEHAVIOR ESTIMATION DEVICE

(71) Applicants: Nissan Motor Co., Ltd., Yokohama (JP); Renault S.A.S., Boulogne-Billancourt (FR)

(72) Inventors: Shinya Tanaka, Kanagawa (JP); Shoichi Takei, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/916,763

(22) PCT Filed: Apr. 6, 2020

(86) PCT No.: PCT/IB2020/000327
§ 371 (c)(1),
(2) Date: Oct. 3, 2022

(87) PCT Pub. No.: WO2021/205192
PCT Pub. Date: Oct. 14, 2021

(65) Prior Publication Data
US 2023/0159035 A1 May 25, 2023

(51) Int. Cl.
*B60W 40/10* (2012.01)
*B60W 30/18* (2012.01)

(52) U.S. Cl.
CPC ............ *B60W 40/10* (2013.01); *B60W 30/18* (2013.01); *B60W 2554/80* (2020.02)

(58) Field of Classification Search
CPC ... B60W 40/10; B60W 30/18; B60W 2554/80
See application file for complete search history.

(56) References Cited

U.S. PATENT DOCUMENTS 10,783,789 B2    9/2020   Mizutani
2013/0289824 A1*  10/2013  Mudalige ............... G08G 1/167
                                                        701/1

(Continued)

FOREIGN PATENT DOCUMENTS

CN       110267856 A       9/2019
JP       2017-204071 A    11/2017

(Continued)

*Primary Examiner* — Peter D Nolan
*Assistant Examiner* — Wae L Louie
(74) *Attorney, Agent, or Firm* — Young Basile Hanlon & MacFarlane, P.C.

(57) ABSTRACT

A vehicle behavior estimation method includes: detecting a speed of a first preceding vehicle traveling in front of a host vehicle in a first lane where the host vehicle is traveling; detecting a speed of an adjacent vehicle traveling in a second lane adjacent to the first lane; calculating a relative speed between the first preceding vehicle and the adjacent vehicle; predicting whether or not an absolute value of the relative speed will be at or below a speed threshold value within a predetermined time from a point time when a decrease in the absolute value of the relative speed starts to be detected; and estimating that the adjacent vehicle is likely to change lanes into the first lane when the absolute value of the relative speed is predicted to be at or below the speed threshold value within the predetermined time.

12 Claims, 14 Drawing Sheets

(56) References Cited

U.S. PATENT DOCUMENTS

| | | | |
|---|---|---|---|
| 2016/0021178 A1* | 1/2016 | Liu | H04L 41/06 |
| | | | 370/216 |
| 2017/0183035 A1* | 6/2017 | Patana | B60W 30/12 |
| 2018/0253975 A1 | 9/2018 | Mizutani | |
| 2018/0339708 A1* | 11/2018 | Geller | B60L 3/0015 |
| 2018/0354510 A1* | 12/2018 | Miyata | B60W 60/00276 |
| 2019/0061766 A1* | 2/2019 | Nishiguchi | B60W 10/06 |
| 2020/0001867 A1 | 1/2020 | Mizutani et al. | |
| 2022/0024461 A1* | 1/2022 | Takei | G08G 1/0145 |
| 2022/0084397 A1* | 3/2022 | Tanaka | B60W 30/18163 |
| 2022/0410890 A1* | 12/2022 | Takei | B60W 30/143 |

FOREIGN PATENT DOCUMENTS

| | | |
|---|---|---|
| JP | 2018-147040 A | 9/2018 |
| JP | 2018-181036 A | 11/2018 |

* cited by examiner

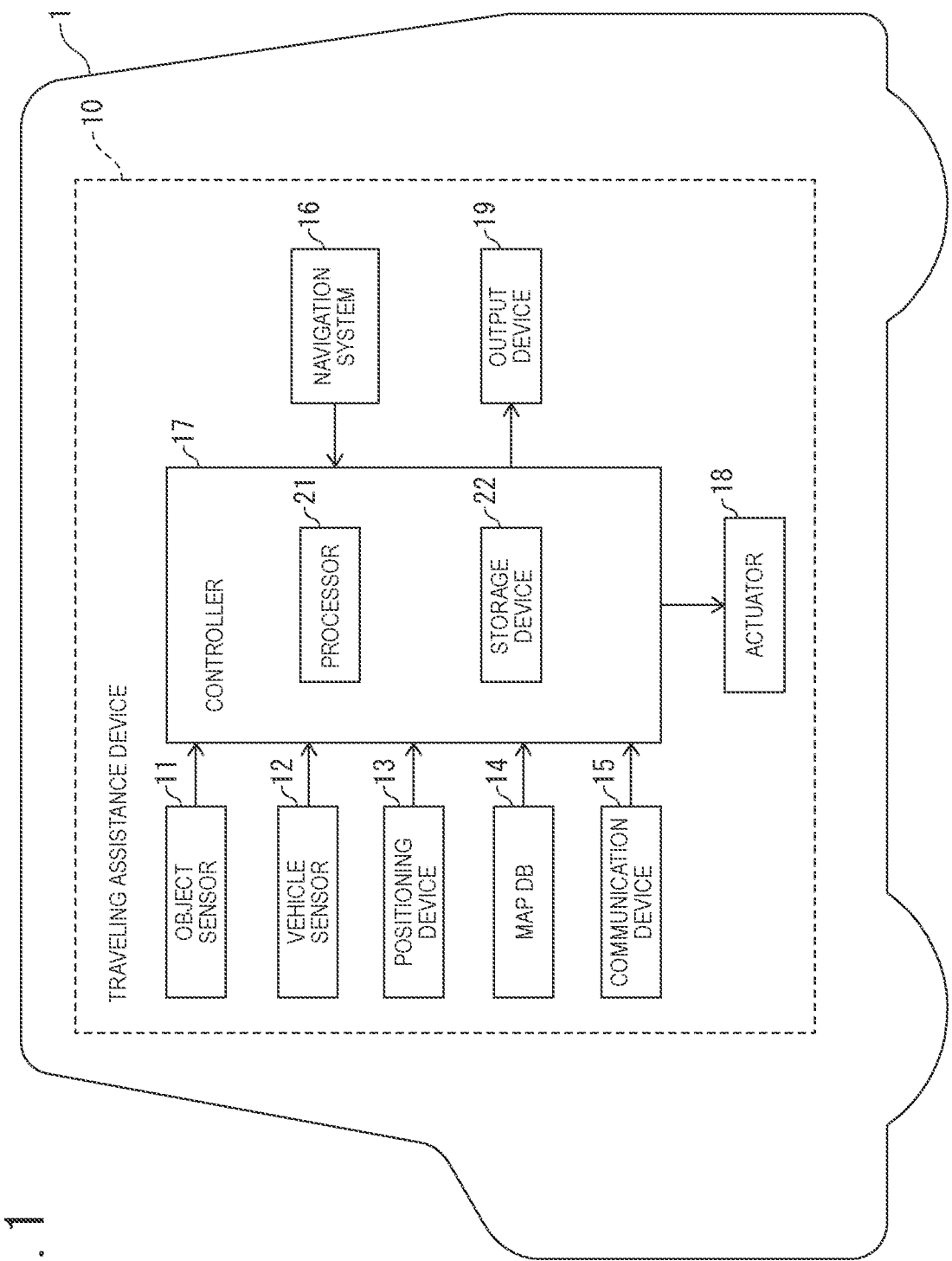

VEHICLE BEHAVIOR ESTIMATION METHOD, VEHICLE CONTROL METHOD, AND VEHICLE BEHAVIOR ESTIMATION DEVICE

TECHNICAL FIELD

The present invention relates to a vehicle behavior estimation method, a vehicle control method, and a vehicle behavior estimation device.

BACKGROUND

Lane change estimation devices are known that estimate that an adjacent vehicle traveling in a second lane adjacent to a first lane where a host vehicle and a preceding vehicle of the host vehicle are traveling changes lanes into the first lane. For example, a lane change estimation device described in JP 2018-147040 A below calculates a first indicator value indicating the likelihood of an adjacent vehicle to change lanes as a larger value the smaller the relative speed between the adjacent vehicle and a preceding vehicle is, and determines the likelihood that the adjacent vehicle will change lanes on the basis of the calculated first indicator value.

SUMMARY

However, the lane change estimation device described in JP 2018-147040 A makes the determination on the basis of a current value of the relative speed. Therefore, when the relative speed between the adjacent vehicle and the preceding vehicle is small even if a driver of the adjacent vehicle does not intend to change lanes, it may be erroneously determined that a lane change is highly likely to be made.

It is an object of the present invention to improve accuracy in estimating the likelihood that an adjacent vehicle will change lanes into a first lane where a host vehicle is traveling.

According to an aspect of the present invention, there is provided a vehicle behavior estimation method including: detecting a speed of a first preceding vehicle traveling in front of a host vehicle in a first lane where the host vehicle is traveling; detecting a speed of an adjacent vehicle traveling in a second lane adjacent to the first lane; calculating a relative speed between the first preceding vehicle and the adjacent vehicle; predicting whether or not an absolute value of the relative speed will be at or below a speed threshold value within a predetermined time from a point time when a decrease in the absolute value of the relative speed starts to be detected; and estimating that the adjacent vehicle is likely to change lanes into the first lane when the absolute value of the relative speed is predicted to be at or below the speed threshold value within the predetermined time.

According to an aspect of the present invention, it is possible to improve accuracy in estimating the likelihood that an adjacent vehicle will change lanes into a first lane where a host vehicle is traveling.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 1 is a diagram illustrating an example of a schematic configuration of a host vehicle provided with a traveling assistance device according to an embodiment;

DETAILED DESCRIPTION

Figure 2A:
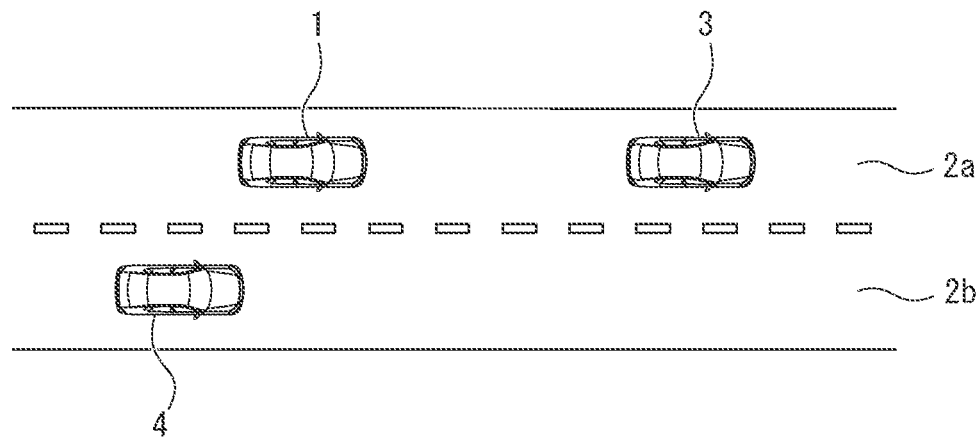
FIG. 2A is an illustrative diagram of a positional relationship between a host vehicle, a first preceding vehicle, and an adjacent vehicle.

Hereinafter, embodiments of the present invention are described with reference to the drawings. In the descriptions of the drawings, the same or similar portions are denoted by the same or similar reference signs, and duplicate descriptions are omitted. Each drawing is schematic, and may be different from reality. The following embodiments exemplify devices and methods for embodying the technological concept of the present invention, and the technological concept of the present invention is not specific to the devices and methods exemplified in the embodiments given below. The technological concept of the present invention may be modified in various ways within the technological scope described in the claims.

First Embodiment (Configuration)

A host vehicle 1 includes a traveling assistance device 10 that assists driving of the host vehicle 1. The traveling assistance device 10 detects a host vehicle position, which is a current position of the host vehicle 1, and assists traveling of the host vehicle 1 on the basis of the detected host vehicle position.

For example, the traveling assistance device 10 automatically controls driving of the host vehicle 1 on the basis of the detected host vehicle position and a surrounding driving environment to assist the traveling of the host vehicle 1. In other words, the traveling assistance device 10 is a type of vehicle control device that executes vehicle control of the host vehicle 1.

The automatic control of the host vehicle 1 may include, for example, autonomous traveling control in which the host vehicle 1 is driven automatically without the involvement of an occupant (for example, a driver). The automatic control of the host vehicle 1 may also include, for example, automatically controlling at least one of acceleration or deceleration of the host vehicle 1.

Additionally, for example, the traveling assistance device 10 may assist the driving of the host vehicle 1 by the driver according to the traveling environment around the host vehicle 1 to assist the traveling of the host vehicle 1. On the basis of an estimated host vehicle position and the surrounding traveling environment, the traveling assistance device 10 may output a message for prompting the driver to adjust the inter-vehicle distance and speed, a message for telling the driver the prohibition of acceleration, or a notification sound or a display for prompting the driver to call attention to the surrounding traveling environment to assist driving by the driver.

The traveling assistance device 10 includes an object sensor 11, a vehicle sensor 12, a positioning device 13, a map database 14, a communication device 15, a navigation system 16, a controller 17, an actuator 18, and an output device 19. In the drawings, the map database is denoted as "MAP DB".

Note that the object sensor 11 and the controller 17 are an example of a "vehicle behavior estimation device" described in the claims.

The object sensor 11 includes a plurality of different types of sensors that detect objects around the host vehicle 1.

For example, the object sensor 11 includes a camera mounted on the host vehicle 1. The camera captures an image of a predetermined view angle range (shooting range) in front of the host vehicle 1, and outputs a captured image to the controller 17.

In addition, the object sensor 11 may include a distance measuring sensor such as a laser radar, a millimeter-wave radar, or a LIDAR (light detection and ranging or laser imaging detection and ranging) system.

The vehicle sensor 12 is mounted on the host vehicle 1, and detects a variety of information (vehicle signals) obtainable from the host vehicle 1. Examples of the vehicle sensor 12 include a vehicle speed sensor that detects a traveling speed (vehicle speed) of the host vehicle 1, a vehicle wheel speed sensor that detects a rotational speed of each tire mounted on the host vehicle 1, a triaxial acceleration sensor (G sensor) that detects acceleration (including deceleration) of the host vehicle 1 in three axial directions, a steering angle sensor that detects a steering angle (including a turning angle), a gyro sensor that detects an angular velocity generated in the host vehicle 1, a yaw rate sensor that detects yaw rate, an accelerator sensor that detects an accelerator position of the host vehicle, and a brake sensor that detects the amount of braking operation by the occupant.

The positioning device 13 includes a global navigation satellite system (GNSS) receiver, and receives radio waves from a plurality of navigation satellites to measure a current position of the host vehicle 1. The GNSS receiver may be, for example, a global positioning system (GPS) receiver or the like. For example, the positioning device 13 may be an inertial navigation system.

The map database 14 may store high-definition map data (hereinafter simply referred to as "high-definition map") suitable as map information for automatic driving. The high-definition map is map data with higher precision than map data for navigation (hereinafter simply referred to as "navigation map").

Road information contained in the high-definition map includes information of information in units of lanes, which is more detailed than information in units of roads. Hereinafter, the information in units of lanes included in the high-definition map data may be denoted as "lane information".

For example, the high-definition map includes, as the lane information, information on a lane node indicating a reference point on a lane reference line (for example, a center line in a lane) and information on a lane link indicating forms of lane sections between lane nodes.

The information on a lane node includes an identification number of the lane node, positional coordinates thereof, the number of connected lane links, and identification numbers of the connected lane links. The information on a lane link includes an identification number of the lane link, lane type, lane width, lane demarcation line type, lane shape, lane gradient, and lane demarcation line shape.

The high-definition map further includes information on ground objects, such as types and positional coordinates of ground objects such as stop lines, signs, buildings, utility poles, curbs, pedestrian crossings, and architectures that are present on or near lanes, and identification numbers of lane nodes and identification numbers of lane links corresponding to the positional coordinates of the ground objects.

The communication device 15 performs wireless communication with a communication device external to the host vehicle 1. A communication method by the communication device 15 may be, for example, wireless communication through a public mobile phone network, vehicle-to-vehicle communication, road-to-vehicle communication, or satellite communication.

The navigation system 16 recognizes the current position of the host vehicle 1 by the positioning device 13, and acquires map information in the current position from the map database 14. The navigation system 16 sets a traveling route to a destination input by the occupant, and provides a route guidance to the occupant according to the traveling route.

The navigation system 16 also outputs information on the set traveling route to the controller 17. When performing autonomous traveling control, the controller 17 automatically drives the host vehicle 1 so that the host vehicle 1 travels along the traveling route set by the navigation system 16.

The controller 17 is an electronic control unit (ECU) that performs traveling assistance control of the host vehicle 1.

The controller 17 automatically controls traveling of the host vehicle 1 on the basis of a surrounding traveling environment during the traveling assistance control of the host vehicle 1. Alternatively, the controller 17 assists driving of the host vehicle 1 by the occupant according to the traveling environment around the host vehicle 1.

Therefore, the controller 17 executes a vehicle behavior estimation method of an embodiment when executing the traveling assistance control of the host vehicle 1. Details of the vehicle behavior estimation method are described later.

The controller 17 includes a processor 21 and peripheral components such as a storage device 22. The processor 21 may be, for example, a central processing unit (CPU) or a micro-processing unit (MPU).

The storage device 22 may include a semiconductor storage device, a magnetic storage device, an optical storage device, or the like. The storage device 22 may include registers, a cache memory, and a memory used as a main storage device, such as a read only memory (ROM) and a random access memory (RAM).

Functions of the controller 17 described below are achieved by, for example, causing the processor 21 to execute a computer program stored in the storage device 22.

Note that the controller 17 may be formed by dedicated hardware for executing information processing described below.

For example, the controller 17 may include a functional logic circuit that is set in a general-purpose semiconductor integrated circuit. For example, the controller 17 may include a programmable logic device (PLD) such as a field-programmable gate array (FPGA), or the like.

The actuator 18 operates a steering mechanism, an accelerator position, and a brake device of the host vehicle 1 to generate a vehicle behavior of the host vehicle 1 in response to control signals from the controller 17. The actuator 18 includes a steering actuator, an accelerator position actuator, and a brake control actuator. The steering actuator controls a steering direction and a steering amount of the steering mechanism of the host vehicle 1.

The accelerator position actuator controls the accelerator position of the host vehicle 1. The brake control actuator controls the amount of braking by the brake device of the host vehicle 1.

The output device 19 outputs information that the traveling assistance device 10 presents to the occupant for assisting driving (for example, a message for prompting to adjust the inter-vehicle distance and speed, a message for telling the prohibition of acceleration, or a notification sound or a display for prompting the driver to call attention to a surrounding traveling environment). The output device 19 may include, for example, a display device, lamp, or meter that outputs visual information, or a speaker that outputs audio information.

Next, an outline of a vehicle behavior estimation method according to the first embodiment by the controller 17 is described with reference to FIGS. 2A and 2B.

As illustrated in FIG. 2A, assume that the host vehicle 1 is traveling in a first lane 2a. In the first lane 2a, a first preceding vehicle 3, which is a preceding vehicle of the host vehicle 1, is traveling in front of the host vehicle 1. Additionally, in a second lane 2b, which is a lane adjacent to the first lane 2a, an adjacent vehicle 4 is traveling. A traveling direction of the first lane 2a is the same as a traveling direction of the second lane 2b.

When the controller 17 detects the adjacent vehicle 4 traveling within the range of a predetermined distance from the host vehicle 1 in a front-rear direction, the controller 17 estimates whether or not the adjacent vehicle 4 is likely to change lanes into the first lane 2a.

Figure 2B:
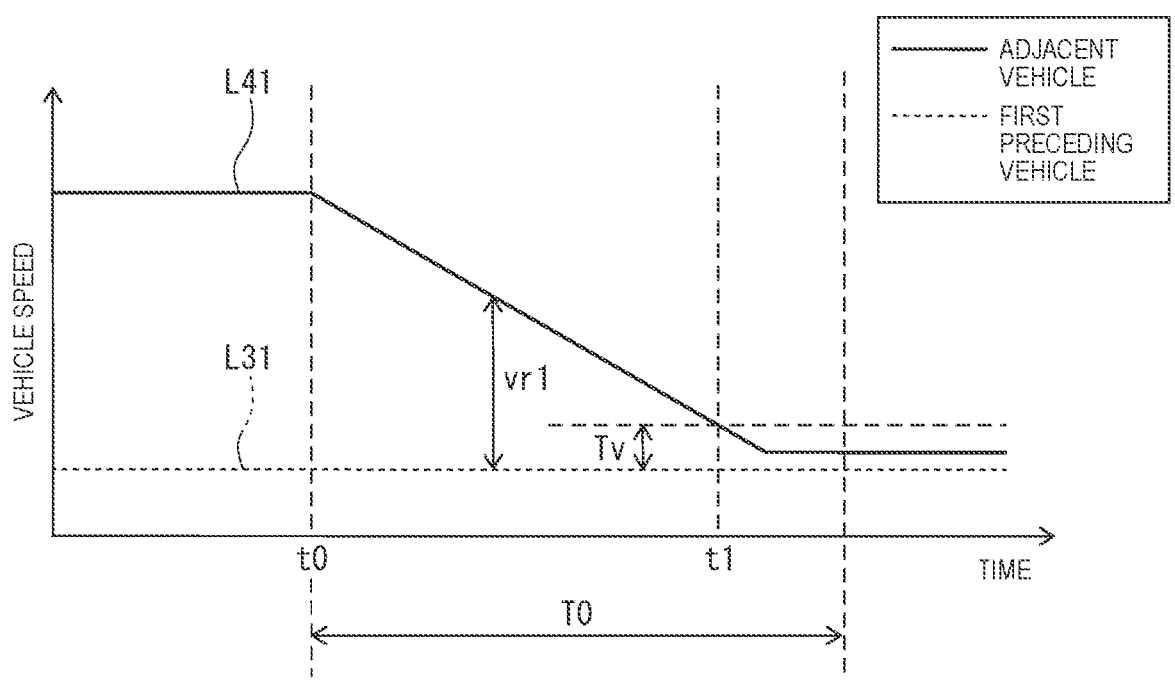
FIG. 2B is an illustrative diagram of an example of a vehicle behavior estimation method according to a first embodiment.

A solid line L41 in FIG. 2B indicates a change in vehicle speed of the adjacent vehicle 4 with elapsed time, and a broken line L31 indicates a change in vehicle speed of the first preceding vehicle 3 with elapsed time.

When the adjacent vehicle 4 attempts to change lanes into the first lane 2a while there is a speed difference between the vehicle speed of the adjacent vehicle 4 and a vehicle speed of a vehicle traveling in the first lane 2a, the adjacent vehicle 4 changes the vehicle speed of the adjacent vehicle 4, and adjusts the vehicle speed of the adjacent vehicle 4 so as to reduce the speed difference between the vehicle speed of the vehicle traveling in the first lane 2a and the vehicle speed of the adjacent vehicle 4. In an example of FIG. 2B, an absolute value vr1 of a relative speed between the first preceding vehicle 3 and the adjacent vehicle 4 starts to decrease from a time point t0.

Thus, the controller 17 determines whether or not the absolute value vr1 of the relative speed between the first preceding vehicle 3 and the adjacent vehicle 4 is decreasing. Then, when the relative speed continues to decrease from the time point t0 when the controller 17 starts to detect that the absolute value vr1 of the relative speed is decreasing, the controller 17 predicts whether or not the absolute value vr1 of the relative speed will be at or below a speed threshold value Tv within a predetermined time T0. Note that the speed threshold value Tv is a relative speed (for example, 4 km/h) that is small enough to determine that the first preceding vehicle 3 and the adjacent vehicle 4 are at substantially the same speed when the absolute value vr1 of the relative speed between the first preceding vehicle 3 and the adjacent vehicle 4 is at or below the speed threshold value Tv. The speed threshold value Tv is a value determined by obtaining through an experiment or the like in advance.

The controller 17 estimates that the adjacent vehicle 4 is likely to change lanes into the first lane 2a when the controller 17 predicts that the absolute value vr1 of the relative speed will be at or below the speed threshold value Tv within the predetermined time T0. When the controller 17 does not predict that the absolute value vr1 of the relative speed will be at or below the speed threshold value Tv within the predetermined time T0, the controller 17 does not estimate that the adjacent vehicle 4 is likely to change lanes into the first lane 2a.

In the example of FIG. 2B, the absolute value vr1 is predicted to be at or below the speed threshold value Tv at a time point t1 within the predetermined time T0. Therefore, the controller 17 estimates that the adjacent vehicle 4 is likely to change lanes into the first lane 2a.

Thus, the vehicle behavior estimation method of the first embodiment estimates the likelihood that the adjacent vehicle 4 will change lanes into the first lane 2a on the basis of whether the relative speed is decreasing or not and a prediction result on whether or not the absolute value of the relative speed will be at or below the speed threshold value Tv within the predetermined time from a time point where the relative speed starts to decrease.

This improves the accuracy of the estimation compared with estimating the likelihood of a lane change on the basis of a current value of the relative speed.

Figure 3:
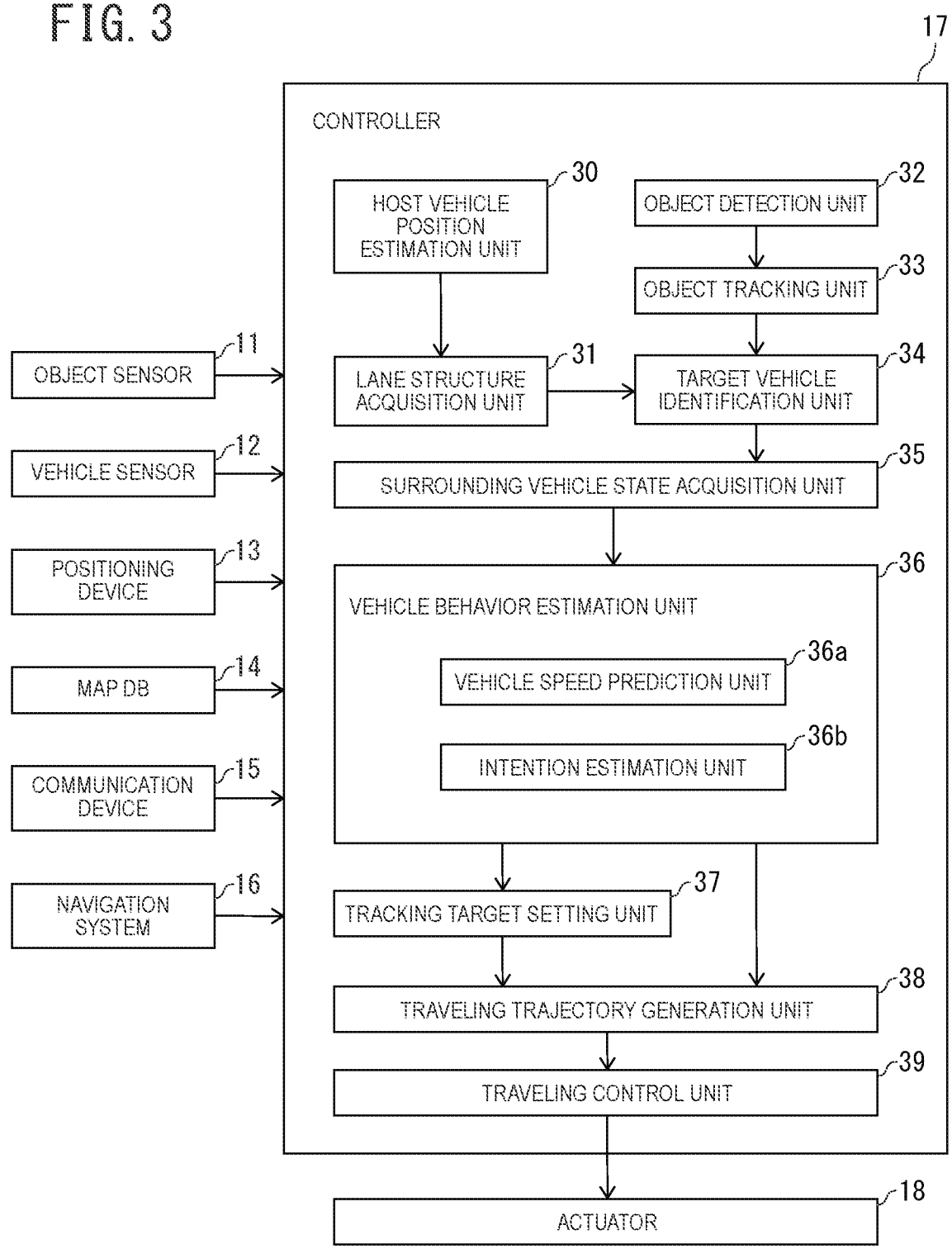
FIG. 3 is a diagram illustrating an example of a functional configuration of a controller 17 of the first embodiment.

Next, functions of the controller 17 are described in detail with reference to FIG. 3. The controller 17 includes a host vehicle position estimation unit 30, a lane structure acquisition unit 31, an object detection unit 32, an object tracking unit 33, a target vehicle identification unit 34, a surrounding vehicle state acquisition unit 35, a vehicle behavior estimation unit 36, a tracking target setting unit 37, a traveling trajectory generation unit 38, and a traveling control unit 39.

The host vehicle position estimation unit 30 estimates a host vehicle position on the map stored in the map database 14 where the host vehicle 1 is currently traveling, a posture of the host vehicle 1 (for example, the direction of traveling of the host vehicle 1), and a speed of the host vehicle 1.

The host vehicle position estimation unit 30 estimates the host vehicle position of the host vehicle 1 on the basis of, for example, a positioning result of the positioning device 13, odometry by the vehicle sensor 12, and a result of detection of a target around the host vehicle 1 by the object sensor 11.

The lane structure acquisition unit 31 acquires information on a lane structure, which is the structure of lanes, intersections, and surrounding ground objects (for example, curbs) in front of the host vehicle 1 on a road where the host vehicle 1 is traveling, from the map database 14 on the basis of the host vehicle position of the host vehicle 1 estimated by the host vehicle position estimation unit 30.

he object detection unit 32 detects objects around the host vehicle 1 by the object sensor 11, and acquires the relative position, speed, and size of each of the surrounding objects with respect to the host vehicle 1. The object detection unit 32 determines whether the detected object is a vehicle or not. For example, when the position of the detected object is on the road and the size of the object is within a predetermined range assumed as a vehicle size, the object detection unit 32 determines that the detected object is a vehicle.

The object detection unit 32 detects the positions, postures (for example, the directions of traveling), and speeds of detected other vehicles around the host vehicle 1.

The object tracking unit 33 tracks the objects detected by the object detection unit 32. Specifically, the object tracking unit 33 integrates detection results at a current time of each object output from the object detection unit 32 with past-time detection results to verify (associate) the identity of the each object between different times, and tracks the relative position, speed, and posture of the each object around the host vehicle 1 with respect to the host vehicle 1 on the basis of the association.

The target vehicle identification unit 34 identifies the first preceding vehicle 3 traveling in front of the host vehicle 1 in the first lane 2a and the adjacent vehicle 4 traveling in the second lane 2b on the basis of the lane structure around the host vehicle 1 acquired by the lane structure acquisition unit 31, the object detection results by the object detection unit 32, and the tracking results by the object tracking unit 33.

The target vehicle identification unit 34 may identify, as a lane change determination target, the adjacent vehicle 4 traveling within the range of a predetermined distance previously determined in the front-rear direction from the host vehicle 1. For example, the adjacent vehicle 4 traveling in the second lane 2b within a range from a front-rear direction position of the host vehicle 1 to a front-rear direction position of the first preceding vehicle 3 may be identified as a lane change determination target.

Alternatively, the adjacent vehicle 4 traveling in the second lane 2b within a range from the front-rear direction position of the host vehicle 1 to a position rearward by a predetermined distance may be identified as a lane change determination target.

It should be noted that although the present example uses the relative positional relationships and relative distances between the host vehicle 1 and the adjacent vehicle 4 and between the first preceding vehicle 3 and the adjacent vehicle 4 to identify the adjacent vehicle 4 as the lane change determination target, the present invention is not limited thereto. The adjacent vehicle 4 as the lane change determination target may be identified using other indicators that can define a length of spacing between the vehicles, such as inter-vehicle times between the host vehicle 1 and the adjacent vehicle 4 and between the first preceding vehicle 3 and the adjacent vehicle 4. In other words, among vehicles traveling in the second lane 2b, the adjacent vehicle 4 that is present in such a position that it may change lanes and interrupt between the host vehicle 1 and the first preceding vehicle 3 is identified as the adjacent vehicle 4 that is a lane change determination target.

When the adjacent vehicle 4 as the lane change determination target is identified, the controller 17 estimates whether or not the adjacent vehicle 4 will change lanes by continuously monitoring the likelihood of the adjacent vehicle 4 as the determination target to change lanes. Therefore, the controller 17 repeatedly estimates the likelihood of the adjacent vehicle 4 to change lanes at different times, and accumulates the estimation results to calculate a "certainty degree" (i.e., the level of likelihood) of a lane change as a variable.

The target vehicle identification unit 34 determines whether or not the adjacent vehicle 4 is identified for the first time as a lane change determination target, and initializes the certainty degree for the adjacent vehicle 4 to "0" when the adjacent vehicle 4 is identified for the first time as a lane change determination target.

The surrounding vehicle state acquisition unit 35 generates a speed profile of the adjacent vehicle 4 and a speed profile of the first preceding vehicle 3. For example, the surrounding vehicle state acquisition unit 35 may generate, as a speed profile, a history of vehicle speeds output from the object tracking unit 33 at each time from a past time point by a predetermined time to the current time.

The vehicle behavior estimation unit 36 estimates whether or not the adjacent vehicle 4 will change lanes into the first lane 2a (for example, a section between the host vehicle 1 and the first preceding vehicle 3 in the first lane 2a) on the basis of the speed profile of the adjacent vehicle 4 and the speed profile of the first preceding vehicle 3.

The vehicle behavior estimation unit 36 includes a vehicle speed prediction unit 36a and an intention estimation unit 36b.

The vehicle speed prediction unit 36a determines whether or not the following condition A for estimating the likelihood of the adjacent vehicle 4 to change lanes into the first lane 2a is satisfied on the basis of the speed profile of the adjacent vehicle 4 and the speed profile of the first preceding vehicle 3 generated by the surrounding vehicle state acquisition unit 35.

(Condition A): It is predicted that the adjacent vehicle 4 is trying to match the vehicle speed thereof to the vehicle speed of the first preceding vehicle 3, and it is predicted that a vehicle speed difference between the vehicle speed of the adjacent vehicle 4 and the vehicle speed of the first preceding vehicle 3 will be at or below the speed threshold value Tv by the time the predetermined time T0 elapses.

The predetermined time T0 may be obtained, for example, experimentally, and may be set to, for example, from 3.0 to 5.0 [sec].

The vehicle speed prediction unit 36a calculates an acceleration $\alpha$ from the speed profile of the adjacent vehicle 4, and adds a product of an elapsed time $\Delta t$ from the current time and the acceleration $\alpha$ to a current vehicle speed Vs(t) to calculate a future predicted speed Vsp of the adjacent vehicle 4 (Vsp=Vs(t)+$\alpha \times \Delta t$). Note that here, the acceleration $\alpha$ is an acceleration in which acceleration in the traveling direction is positive, and acceleration in a direction opposite to the traveling direction is negative.

Similarly, a future predicted speed Vlp of the first preceding vehicle 3 is calculated.

The vehicle speed prediction unit 36a predicts whether or not the adjacent vehicle 4 is trying to match the vehicle speed of the adjacent vehicle 4 to the vehicle speed of the first preceding vehicle 3 on the basis of the absolute value vr1 of the relative speed, which is a speed difference between the predicted speed Vsp and the predicted speed Vlp.

For example, when it is detected that the absolute value vr1 is decreasing, the vehicle speed prediction unit 36*a* predicts that the adjacent vehicle 4 is trying to match the vehicle speed of the adjacent vehicle 4 to the vehicle speed of the first preceding vehicle 3. When it is not detected that the absolute value vr1 is decreasing, the vehicle speed prediction unit 36*a* predicts that the adjacent vehicle 4 is not trying to match the vehicle speed of the adjacent vehicle 4 to the vehicle speed of the first preceding vehicle 3. Note that when the absolute value vr1 starts to decrease and then continues to decrease for a previously determined predetermined time (for example, 1.0 sec) that is shorter than the predetermined time T0, it may be detected that the absolute value vr1 is starting to decrease. This prevents the adjacent vehicle 4 from being predicted to be trying to match the vehicle speed of the adjacent vehicle 4 to the vehicle speed of the first preceding vehicle 3 when the adjacent vehicle 4 is temporarily decelerating without intending to match the vehicle speed of the adjacent vehicle 4 to the vehicle speed of the first preceding vehicle 3.

Furthermore, the vehicle speed prediction unit 36*a* determines whether or not the absolute value vr1 will be at or below the speed threshold value Tv within the predetermined time T0 from the start of the decrease in the absolute value vr1. When the absolute value vr1 is at or below the speed threshold value Tv within the predetermined time T0 from the start of the decrease in the absolute value vr1, the vehicle speed prediction unit 36*a* determines that the condition A is satisfied.

On the contrary, when the absolute value vr1 is not at or below the speed threshold value Tv within the predetermined time T0 from the start of the decrease in the absolute value vr1, the vehicle speed prediction unit 36*a* determines that the condition A is not satisfied.

The intention estimation unit 36*b* estimates whether or not the adjacent vehicle 4 is likely to change lanes into the first lane 2*a* on the basis of the determination result of the vehicle speed prediction unit 36*a*. The intention estimation unit 36*b* estimates that the adjacent vehicle 4 is likely to change lanes into the first lane 2*a* when the condition A is satisfied, and does not estimate that the adjacent vehicle 4 is likely to change lanes into the first lane 2*a* when the condition A is not satisfied.

The intention estimation unit 36*b* repeatedly estimates the likelihood of the adjacent vehicle 4 to change lanes on the basis of whether the condition A is satisfied or not, which has been repeatedly determined at different times by the vehicle speed prediction unit 36*a*.

The intention estimation unit 36*b* accumulates estimation results obtained by the repeated estimations, and calculates a certainty degree. For example, each time the intention estimation unit 36*b* estimates that there is a likelihood of a lane change, the intention estimation unit 36*b* increases the certainty degree by a predetermined step amount (for example, the certainty degree is counted up). On the other hand, when the intention estimation unit 36*b* does not estimate that there is a likelihood of a lane change, the intention estimation unit 36*b* does not change the certainty degree or increases the certainty degree by a step amount smaller than the step amount when it is estimated that there is the likelihood of a lane change.

When the certainty degree exceeds a threshold value, the intention estimation unit 36*b* estimates that the adjacent vehicle 4 will change lanes into the first lane 2*a*.

When the certainty degree does not exceed the threshold value (for example, when the adjacent vehicle 4 accelerates and moves more forward than the first preceding vehicle 3 before the certainty degree exceeds the threshold value, or when the adjacent vehicle 4 decelerates and moves more rearward than the host vehicle 1 before the certainty degree exceeds the threshold value, the intention estimation unit 36*b* does not estimate that the adjacent vehicle 4 will change lanes into the first lane 2*a*.

When an inter-vehicle distance control such as adaptive cruise control (ACC) is executed in the host vehicle 1, the tracking target setting unit 37 sets a vehicle being a tracking target for the inter-vehicle distance control. Note that an inter-vehicle distance in the inter-vehicle distance control is an inter-vehicle distance in a direction along the traveling direction of the host vehicle.

When the vehicle behavior estimation unit 36 estimates that the adjacent vehicle 4 will change lanes into the first lane 2*a*, the tracking target setting unit 37 sets the adjacent vehicle 4 as a tracking target for the inter-vehicle distance control.

When it is not estimated that the adjacent vehicle 4 will change lanes into the first lane 2*a*, the tracking target setting unit 37 sets the first preceding vehicle 3 as a tracking target as it is.

When the adjacent vehicle 4 is set as the tracking target for the inter-vehicle distance control, the traveling trajectory generation unit 38 generates a target traveling trajectory and a target speed profile of the host vehicle 1 on the basis of the relative speed and relative positional relationship between the adjacent vehicle 4 and the host vehicle 1. Note that the target speed profile refers to a target speed according to an elapsed time.

At this time, the traveling trajectory generation unit 38 generates the target speed profile so as to maintain the inter-vehicle distance between the host vehicle 1 and the adjacent vehicle 4. Here, the absolute value vr1 of the relative speed between the first preceding vehicle 3 and the adjacent vehicle 4 is at or below the speed threshold value Tv. Accordingly, generating the target speed profile so as to maintain the inter-vehicle distance between the host vehicle 1 and the adjacent vehicle 4 allows the target speed profile to be generated so as to maintain the inter-vehicle distance between the host vehicle 1 and the first preceding vehicle 3.

When the first preceding vehicle 3 is set as the tracking target for the inter-vehicle distance control, the traveling trajectory generation unit 38 generates the target traveling trajectory and target speed profile of the host vehicle 1 on the basis of the relative speed and relative positional relationship between the host vehicle 1 and the first preceding vehicle 3.

Additionally, when the inter-vehicle distance control is not executed in the host vehicle 1, the traveling trajectory generation unit 38 generates a driving action plan for the host vehicle 1 on the basis of a route space map representing the presence or absence of routes and objects around the host vehicle 1 and a risk map quantifying the danger of a driving field.

The traveling trajectory generation unit 38 generates a target traveling trajectory for driving the host vehicle 1 on the basis of the planned driving action, motion characteristics of the host vehicle 1, the route space map, and the risk map.

When the vehicle behavior estimation unit 36 estimates that the adjacent vehicle 4 will change lanes into the first lane 2*a*, the traveling trajectory generation unit 38 generates any of a target speed profile that increases or maintains the inter-vehicle distance between the host vehicle 1 and the first preceding vehicle 3, a target speed profile that reduces or maintains the vehicle speed of the host vehicle 1, or a target speed profile at which the host vehicle 1 does not accelerate.

This can facilitate the adjacent vehicle 4 to change lanes into the first lane 2a (for example, the section between the host vehicle 1 and the first preceding vehicle 3 in the first lane 2a).

The traveling control unit 39 drives the actuator 18 so that the host vehicle 1 travels on the target traveling trajectory at a speed according to the target speed profile generated by the traveling trajectory generation unit 38.

As a result, when the vehicle behavior estimation unit 36 estimates that the adjacent vehicle 4 will change lanes into the first lane 2a, the traveling control unit 39 executes at least one of a vehicle control that increases or maintains the inter-vehicle distance between the host vehicle 1 and the first preceding vehicle 3, a vehicle control that reduces or maintains the vehicle speed of the host vehicle 1, or a vehicle control that prohibits acceleration of the host vehicle 1.

In addition, when the vehicle behavior estimation unit 36 estimates that the adjacent vehicle 4 will change lanes into the first lane 2a, the output device 19 may execute driving assistance by outputting a message such as a sound and/or a display that tells the driver.

For example, the output device 19 may output any one of a message that prompts to increase or maintain the inter-vehicle distance between the host vehicle 1 and the first preceding vehicle 3, a message that prompts to reduce or maintain the vehicle speed of the host vehicle 1, a message that prohibits acceleration of the host vehicle 1, or a message that prompts to call attention to the surrounding traveling environment.

(Operation)

Figure 4:
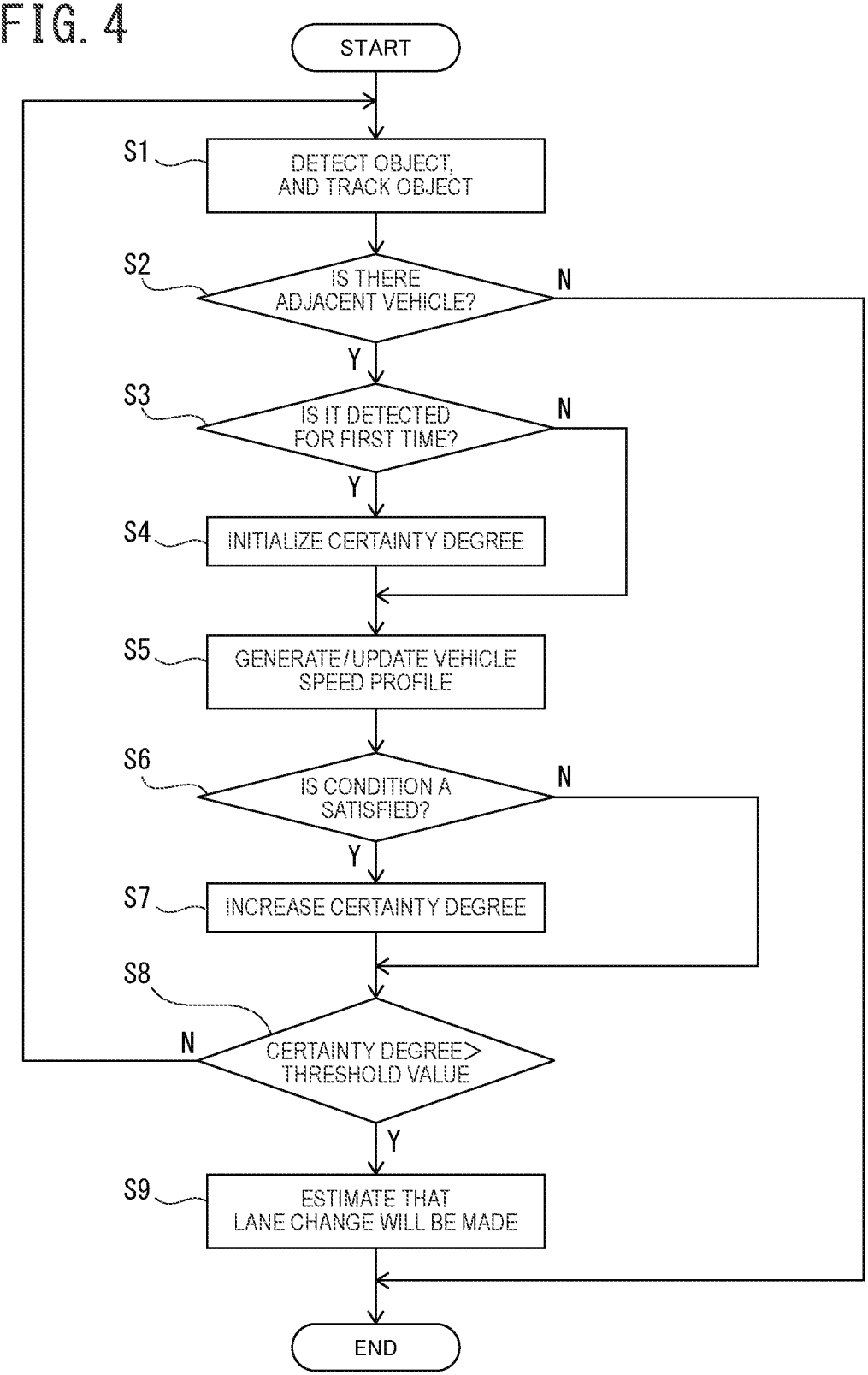
FIG. 4 is a flowchart of an example of the vehicle behavior estimation method of the first embodiment.

Next, an example of the vehicle behavior estimation method by the traveling assistance device 10 according to the first embodiment is described with reference to FIG. 4.

At step S1, the host vehicle position estimation unit 30 estimates the host vehicle position of the host vehicle 1. The lane structure acquisition unit 31 acquires information on a lane and an intersection in front of the host vehicle 1 and a lane structure therearound. The object detection unit 32 detects objects around the host vehicle 1 by the object sensor 11, and the object tracking unit 33 tracks each of the objects detected by the object detection unit 32.

At step S2, the target vehicle identification unit 34 determines whether or not the adjacent vehicle 4 to be determined as to whether or not to change lanes is present around the host vehicle 1. When the adjacent vehicle 4 is present (step S2: Y), processing proceeds to step S3. When the adjacent vehicle 4 is not present (step S2: N), processing ends.

At step S3, the target vehicle identification unit 34 determines whether or not the adjacent vehicle 4 is detected for the first time as a lane change determination target. When the adjacent vehicle 4 is detected for the first time (step S3: Y), processing proceeds to step S4. If the adjacent vehicle 4 has already been detected as the lane change determination target in a previous processing loop (step S3: N), processing proceeds to step S5.

At step S4, the target vehicle identification unit 34 initializes the "certainty degree", which is the variable that indicates the level of likelihood of the adjacent vehicle 4 to change lanes, to "0". Then, processing proceeds to step S5.

At step S5, the surrounding vehicle state acquisition unit 35 generates the speed profile of the adjacent vehicle 4 and the speed profile of the first preceding vehicle 3. If the speed profiles have already been generated in the previous processing loop, new speed profiles are generated again. Here, assuming that the adjacent vehicle 4 and the first preceding vehicle 3 maintain the current accelerations, as illustrated in FIG. 2B, the speed profile of the adjacent vehicle 4 and the speed profile of the first preceding vehicle 3 can be generated from the current vehicle speeds and accelerations of the adjacent vehicle 4 and the first preceding vehicle 3.

At step S6, the vehicle speed prediction unit 36a determines whether the above condition A is satisfied or not. When the condition A is satisfied (step S6: Y), processing proceeds to step S7. When the condition A is not satisfied (step S6: N), processing proceeds to step S8.

At step S7, the intention estimation unit 36b increases the certainty degree by a predetermined step amount.

At step S8, the intention estimation unit 36b determines whether or not the certainty degree is larger than a threshold value. When the certainty degree is larger than the threshold value (step S8: Y), processing proceeds to step S9.

At step S9, the intention estimation unit 36b estimates that the adjacent vehicle 4 will change lanes into the first lane 2a. Then, processing ends.

On the other hand, at step S8, when it is not determined that the certainty degree is larger than the threshold value (step S8: N), processing returns to step S1.

At step S1, the host vehicle position of the host vehicle 1 is estimated again, information on the lane structure is acquired, objects around the host vehicle 1 are detected, and each object is tracked.

At step S2, when the adjacent vehicle 4 is present (step S2: Y), steps S3 to S8 are repeated.

On the other hand, when the adjacent vehicle 4 is not present (step S2: N), for example, when the adjacent vehicle 4 accelerates and moves more forward than the first preceding vehicle 3 or when the adjacent vehicle 4 decelerates and moves more rearward than the host vehicle 1, the intention estimation unit 36b does not estimate that the adjacent vehicle 4 will change lanes into the first lane 2a, and processing ends.

Effects of First Embodiment (1) The object detection unit 32 detects the speed of the first preceding vehicle 3 traveling in front of the host vehicle 1 in the first lane 2a where the host vehicle 1 is traveling, and detects the speed of the adjacent vehicle 4 traveling in the second lane 2b adjacent to the first lane 2a. The vehicle speed prediction unit 36a calculates the relative speed between the first preceding vehicle 3 and the adjacent vehicle 4, and predicts whether or not the absolute value of the relative speed will be at or below the speed threshold value within the predetermined time from the time point where the decrease in the absolute value of the relative speed starts to be detected. When it is predicted that the absolute value of the relative speed will be at or below the speed threshold value within the predetermined time, the intention estimation unit 36b estimates that the adjacent vehicle 4 is likely to change lanes into the first lane 2a.

Thus, the intention of the adjacent vehicle 4 to change lanes is estimated on the basis of the change over time in the absolute value of the relative speed. This can prevent an erroneous determination in situations where an erroneous determination occurs in the conventional technology, for example, such as a case where a relative speed with a preceding vehicle happens to be small.

Additionally, when the adjacent vehicle 4 changes lanes between the host vehicle 1 and the first preceding vehicle 3, the adjacent vehicle 4 matches to the vehicle speed of the first preceding vehicle 3 in many cases. The first embodiment estimates the likelihood of the lane change by focusing on the change over time of the relative speed between the adjacent vehicle 4 and the first preceding vehicle 3. Therefore, the intention of the adjacent vehicle 4 to change lanes can be detected early.

(2) The intention estimation unit 36b may calculate the certainty degree by accumulating the estimation results obtained by repeatedly estimating the likelihood of the adjacent vehicle 4 to change lanes between the host vehicle 1 and the first preceding vehicle 3. The intention estimation unit 36b may estimate that the adjacent vehicle 4 will change lanes into the first lane 2a when the certainty degree exceeds the threshold value.

Thus, the accuracy of the estimation can be further improved by estimating on the basis of the results obtained by repeatedly estimating at a plurality of different times.

Second Embodiment (Configuration)

Next, a second embodiment is described. The vehicle behavior estimation unit 36 of the second embodiment determines whether or not the adjacent vehicle 4 is likely to change lanes into the first lane 2a on the basis of a condition regarding a positional relationship between the adjacent vehicle 4 and the first preceding vehicle 3 when changing lanes, in addition to the condition A of the first embodiment regarding the relative speed between the adjacent vehicle 4 and the first preceding vehicle 3.

Figure 5:
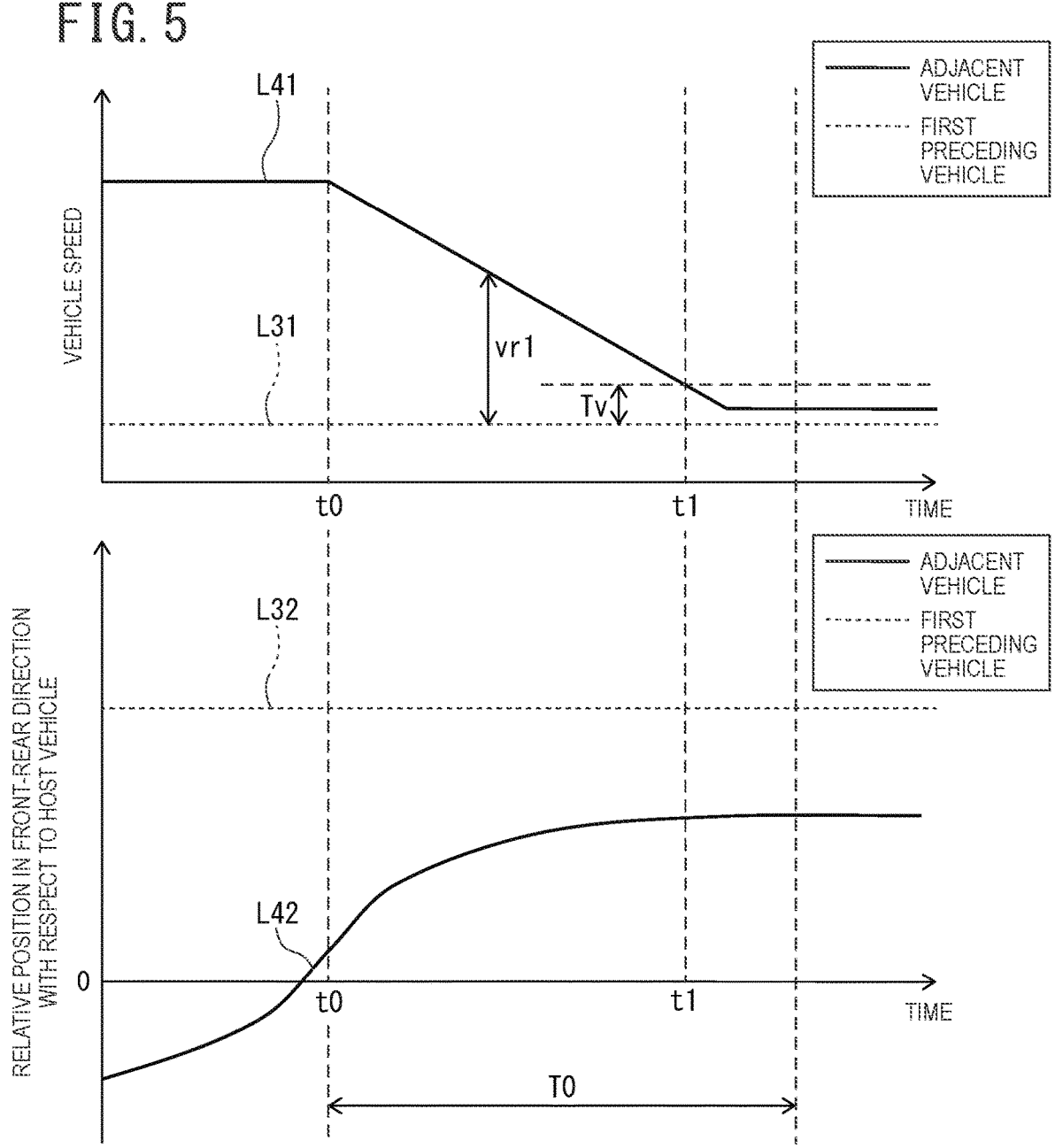
FIG. 5 is an illustrative diagram of an example of a vehicle behavior estimation method of a second embodiment.

Reference is made to FIG. 5. A solid line L42 indicates a relative position in the front-rear direction of the adjacent vehicle 4 with respect to the host vehicle 1 (i.e., a relative distance in the front-rear direction from the host vehicle 1 to the adjacent vehicle 4), and a broken line L32 indicates a relative position in the front-rear direction of the first preceding vehicle 3 with respect to the host vehicle 1 (i.e., a relative distance in the front-rear direction from the host vehicle 1 to the first preceding vehicle 3). Note that FIG. 5 illustrates a state in which the host vehicle 1 is following the first preceding vehicle 3 and traveling at the same speed as that of the first preceding vehicle 3.

When the adjacent vehicle 4 changes lanes into the first lane 2a while matching the vehicle speed of the adjacent vehicle 4 to the vehicle speed of the first preceding vehicle 3, the adjacent vehicle 4 is considered to change lanes into a range behind the first preceding vehicle 3.

Accordingly, the vehicle behavior estimation unit 36 determines whether or not the front-rear direction position of the adjacent vehicle 4 is located behind the front-rear direction position of the first preceding vehicle 3 at a time point t1 where the absolute value vr1 of the relative speed between the adjacent vehicle 4 and the first preceding vehicle 3 of the first embodiment is at or below the speed threshold value Tv.

When the above condition A is satisfied and the front-rear direction position of the adjacent vehicle 4 is located behind the front-rear direction position of the first preceding vehicle 3 at the time point t1, the vehicle behavior estimation unit 36 estimates that the adjacent vehicle 4 is likely to change lanes into the first lane 2a. For example, the vehicle behavior estimation unit 36 estimates that the adjacent vehicle 4 will change lanes into a range behind the first preceding vehicle 3.

On the other hand, when the above condition A is not satisfied or the front-rear direction position of the adjacent vehicle 4 is not located behind the front-rear direction position of the first preceding vehicle 3 at the time point t1, the vehicle behavior estimation unit 36 does not estimate that the adjacent vehicle 4 is likely to change lanes into the first lane 2a.

Figure 6:
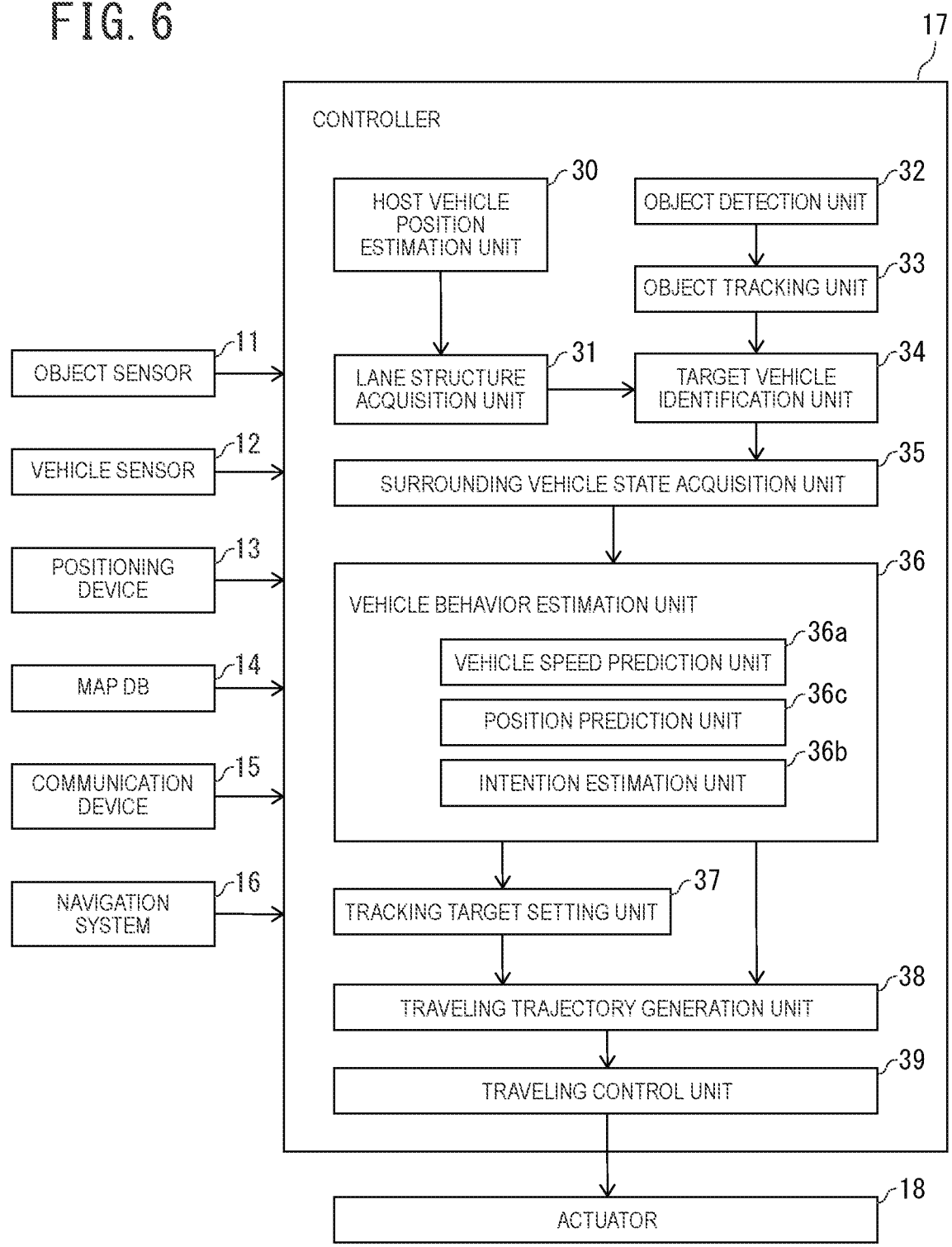
FIG. 6 is a diagram illustrating an example of a functional configuration of the controller 17 of the second embodiment.

Functions of the controller 17 of the second embodiment are described in detail with reference to FIG. 6. The controller 17 of the second embodiment has the same configuration as that of the first embodiment. Among components of the controller 17 of the second embodiment, the same components as those of the first embodiment are denoted by the same reference signs.

The vehicle behavior estimation unit 36 of the second embodiment includes a position prediction unit 36c.

The position prediction unit 36c predicts a front-rear direction position of the adjacent vehicle 4 and a front-rear direction position of the first preceding vehicle 3 at the time point t1 where the absolute value vr1 of the relative speed is at or below the speed threshold value Tv on the basis of the predicted speed Vsp of the adjacent vehicle 4 and the predicted speed Vlp of the first preceding vehicle 3 calculated by the vehicle speed prediction unit 36a.

For example, a predicted position Psp of the front-rear direction of the adjacent vehicle 4 can be predicted as a sum of a product of the elapsed time Δt from the current time and the predicted speed Vlp plus a current front-rear direction position Ps(t) of the adjacent vehicle 4 (Psp=Ps(t)+Vsp×Δt).

Similarly, a predicted position Plp of the front-rear direction of the first preceding vehicle 3 can also be predicted.

The position prediction unit 36c determines whether the following condition B for estimating the likelihood of the adjacent vehicle 4 to change lanes into the first lane 2a is satisfied or not.

(Condition B): It is predicted that the front-rear direction position Psp of the adjacent vehicle 4 is located behind the front-rear direction position Plp of the first preceding vehicle 3 at the time point t1 where the absolute value vr1 of the relative speed is at or below the speed threshold value Tv.

The intention estimation unit 36b estimates whether or not the adjacent vehicle 4 is likely to change lanes into the first lane 2a on the basis of the determination result of the vehicle speed prediction unit 36a and the determination result of the position prediction unit 36c. The intention estimation unit 36b estimates that the adjacent vehicle 4 is likely to change lanes into the first lane 2a when both the conditions A and B are satisfied.

On the other hand, when at least one of the condition A or B is not satisfied, the intention estimation unit 36b does not estimate that the adjacent vehicle 4 is likely to change lanes into the first lane 2a.

The other function of the intention estimation unit 36b is the same as that of the first embodiment.

(Operation)

Figure 7:
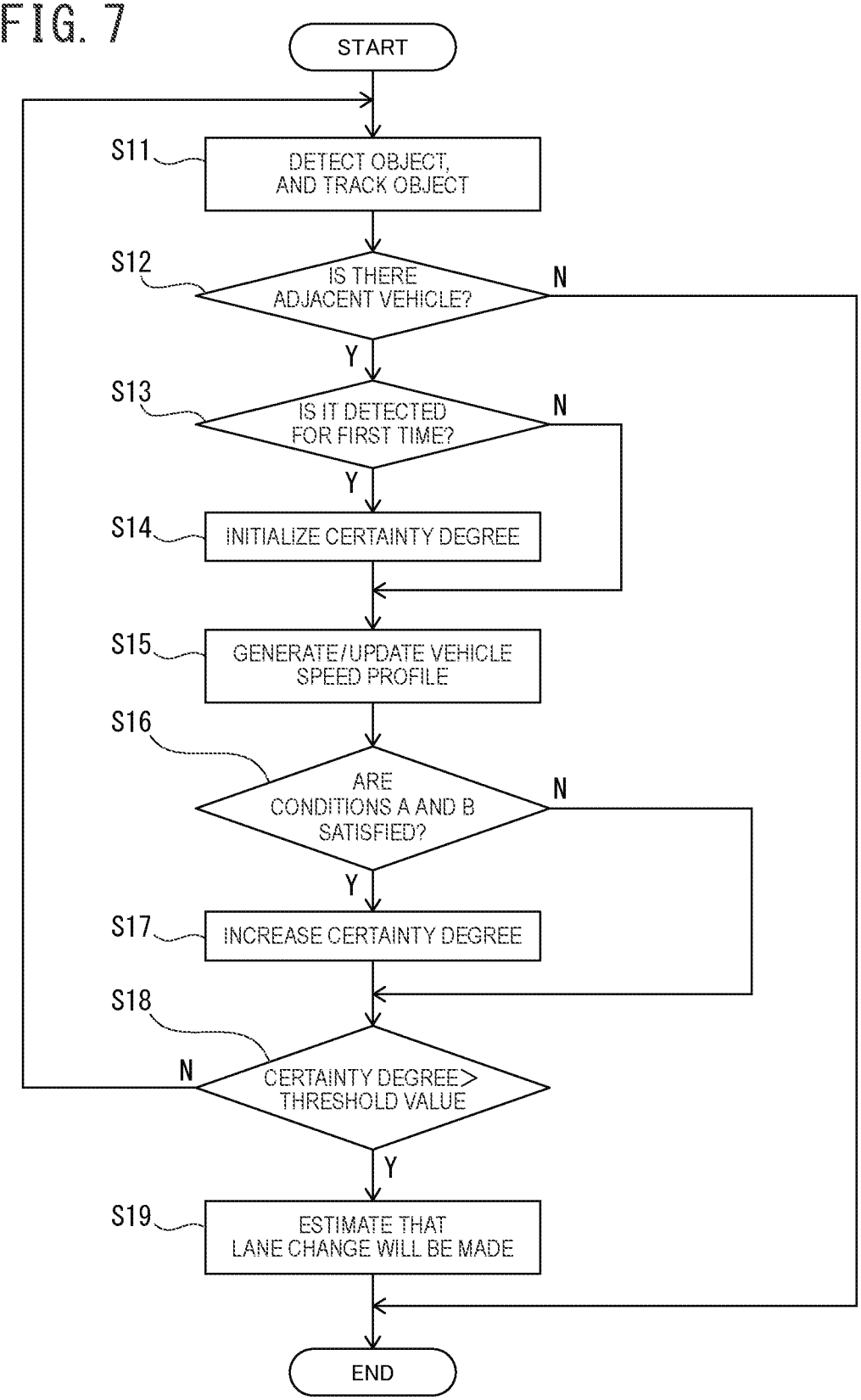
FIG. 7 is a flowchart of an example of the vehicle behavior estimation method of the second embodiment.

Next, an example of the vehicle behavior estimation method by the traveling assistance device 10 according to the second embodiment is described with reference to FIG. 7.

Processing of steps S11 to S15 is the same as that of steps S1 to S5 of the first embodiment described with reference to FIG. 4.

At step S16, the vehicle speed prediction unit 36a determines whether the above condition A is satisfied or not. Additionally, the position prediction unit 36c determines whether the above condition B is satisfied or not. The intention estimation unit 36b determines whether both the conditions A and B are satisfied or not. When both the conditions A and B are satisfied (step S16: Y), processing proceeds to step S17. When at least one of the condition A or B is not satisfied (step S16: N), processing proceeds to step S18.

Processing of steps S17 to S19 is the same as that of steps S7 to S9 of the first embodiment described with reference to FIG. 4.

First Modification

The position prediction unit 36c may estimate whether or not the adjacent vehicle 4 will change lanes into a range in front of the host vehicle 1 and behind the first preceding vehicle 3.

For example, the position prediction unit 36c may predict a front-rear direction position Pop of the host vehicle 1 at the time point t1 where the absolute value vr1 of the relative speed is at or below the speed threshold value Tv, and may determine whether the following condition B1 instead of the above condition B is satisfied or not.

(Condition B1): It is predicted that at the time point t1 where the absolute value vr1 of the relative speed is at or below the speed threshold value Tv, the front-rear direction position Psp of the adjacent vehicle 4 is located in a range in front of the front-rear direction position Pop of the host vehicle 1 and behind the front-rear direction position Plp of the first preceding vehicle 3.

When both the conditions A and B1 are satisfied, the intention estimation unit 36b may estimate that the adjacent vehicle 4 is likely to change lanes into the range in front of the host vehicle 1 and behind the first preceding vehicle 3 in the first lane 2a. When at least one of the condition A or B1 is not satisfied, the intention estimation unit 36b does not estimate that the adjacent vehicle 4 is likely to change lanes into the first lane 2a.

In the example of FIG. 5, it is predicted that the relative position in the front-rear direction of the adjacent vehicle 4 indicated by the solid line L42 is located in a range between the relative position in the front-rear direction of the first preceding vehicle 3 indicated by the broken line L32 and the position of the host vehicle 1, which is an origin, at the time point t1 where the absolute value vr1 of the relative speed is at or below the speed threshold value Tv (condition B1). It is also predicted that the absolute value vr1 will be at or below the speed threshold value Tv at the time point t1 within the predetermined time T0 (condition A).

Therefore, the intention estimation unit 36b estimates that the adjacent vehicle 4 is likely to change lanes into the first lane 2a.

Figure 8:
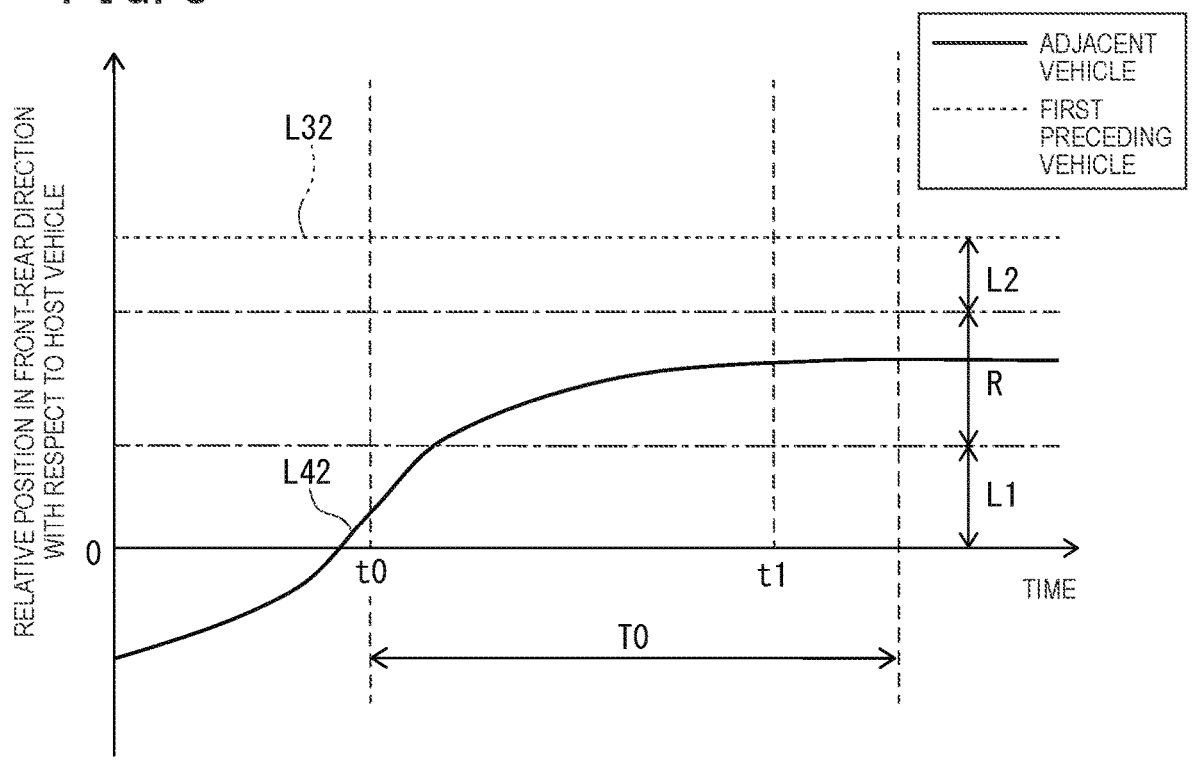
FIG. 8 is an illustrative diagram of a first modification of the second embodiment.

Note that the "range in front of the front-rear direction position Pop of the host vehicle and behind the front-rear direction position Plp of the first preceding vehicle 3" in the above condition B1 may be a range R from a position forward by a first predetermined distance L1 from the front-rear direction position Psp of the host vehicle 1 at the time point t1 to a position rearward by a second predetermined distance L2 from the front-rear direction position Plp of the first preceding vehicle 3 at the time point t1, as illustrated in FIG. 8.

In this case, the second predetermined distance L2 may be set shorter than the first predetermined distance L1.

Second Modification

In addition, when the adjacent vehicle 4 changes lanes into the range in front of the host vehicle 1 and behind the first preceding vehicle 3 in the first lane 2a, it is easier for the adjacent vehicle 4 to maintain an inter-vehicle distance when the adjacent vehicle 4 enters the first lane 2a at a position closer to the first preceding vehicle 3 located forward in the front-rear direction than to the host vehicle 1 located rearward in the front-rear direction.

In other words, the position of the host vehicle 1 located rearward in the front-rear direction is confirmed either by looking rearward diagonally or by a rearview mirror, and therefore is more difficult to confirm than the position of the first preceding vehicle 3 located forward in the front-rear direction. Thus, making the front inter-vehicle distance shorter than the rear inter-vehicle distance allows for a margin in the rear inter-vehicle distance while maintaining the front inter-vehicle distance.

Figure 9:
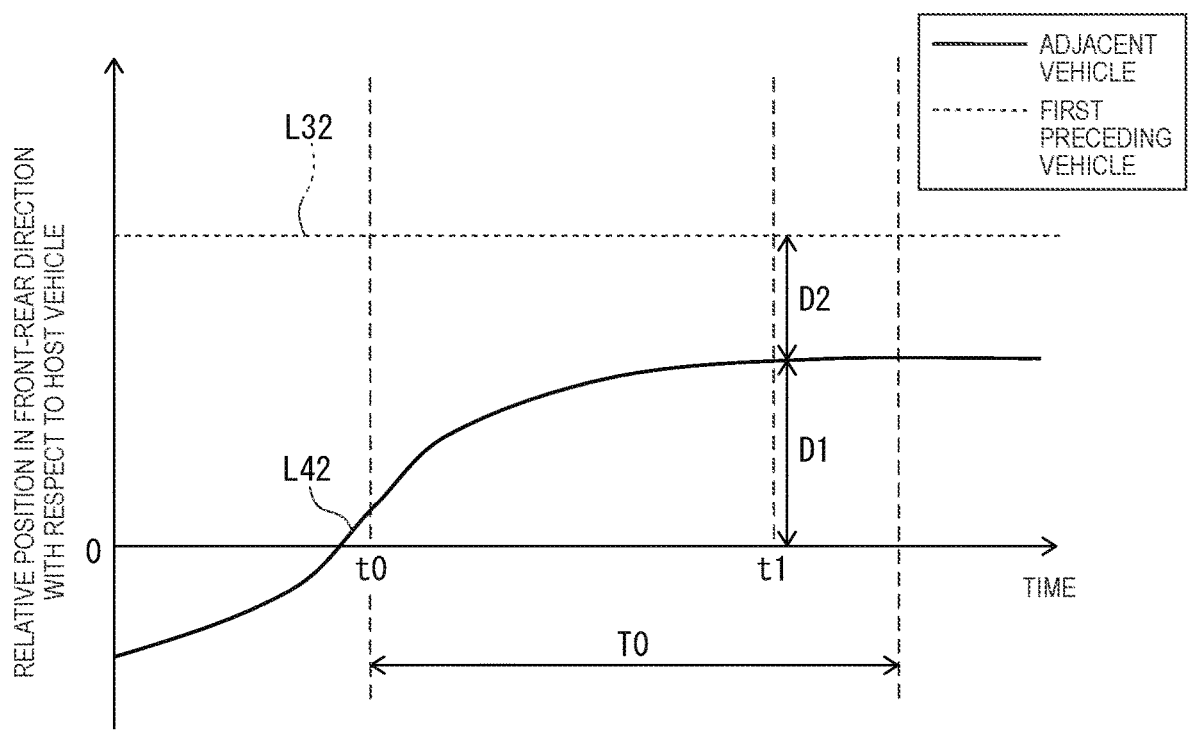
FIG. 9 is an illustrative diagram of a second modification of the second embodiment.

Accordingly, as illustrated in FIG. 9, when a distance D2 between the front-rear direction position Psp of the adjacent vehicle 4 and the front-rear direction position Plp of the first preceding vehicle 3 is shorter than a distance D1 between the front-rear direction position Psp of the adjacent vehicle 4 and the front-rear direction position Pop of the host vehicle 1 at the time point t1 where the absolute value vr1 of the relative speed is at or below the speed threshold value Tv, it can be estimated that the adjacent vehicle 4 is likely to be adjusting the speed of the adjacent vehicle 4 in order to change lanes into the first lane 2a at a position closer to the first preceding vehicle 3 than to the host vehicle 1.

Accordingly, for example, the position prediction unit 36c may determine whether the following condition B2 instead of the above condition B is satisfied or not.

(Condition B2): It is predicted that at the time point t1 where the absolute value vr1 of the relative speed is at or below the speed threshold value Tv, the front-rear direction position Psp of the adjacent vehicle 4 is located in the range in front of the front-rear direction position Pop of the host vehicle 1 and behind the front-rear direction position Plp of the first preceding vehicle 3, and it is also predicted that the front-rear direction position Psp of the adjacent vehicle 4 is closer to the front-rear direction position Plp of the first preceding vehicle 3 than to the front-rear direction position Pop of the host vehicle 1.

When both the conditions A and B2 are satisfied, the intention estimation unit 36b may estimate that the adjacent vehicle 4 is likely to change lanes into the first lane 2a. On the other hand, when at least one of the condition A or B2 is not satisfied, the intention estimation unit 36b does not estimate that the adjacent vehicle 4 is likely to change lanes into the first lane 2a.

Note that the first and second modifications above can also be applied to a third and a fourth embodiments described below.

Effects of Second Embodiment (1) The object detection unit 32 may detect the positions of the adjacent vehicle 4 and the first preceding vehicle 3. When it is predicted that the absolute value vr1 of the relative speed will be at or below the speed threshold value Tv within the predetermined time from the time point where the decrease in the absolute value vr1 of the relative speed starts to be detected, the position prediction unit 36c may predict the front-rear direction position of the adjacent vehicle 4 and the front-rear direction position of the first preceding vehicle 3 at the time point t1 where the absolute value vr1 of the relative speed is at or below the speed threshold value Tv. The position prediction unit 36c and the intention estimation unit 36b may estimate that the adjacent vehicle 4 is likely to change lanes into the first lane 2a when the front-rear direction position of the adjacent vehicle 4 is located behind the front-rear direction position of the first preceding vehicle 3 at the time point t1 where the absolute value vr1 of the relative speed is at or below the speed threshold value Tv.

When the adjacent vehicle 4 changes lanes into the first lane 2a while matching the vehicle speed of the adjacent vehicle 4 to the vehicle speed of the first preceding vehicle 3, the adjacent vehicle 4 is considered to change lanes into the range behind the first preceding vehicle 3.

By estimating whether or not the front-rear direction position of the adjacent vehicle 4 is adjusted to a position more rearward than the front-rear direction position of the first preceding vehicle 3, the likelihood of the adjacent vehicle 4 to change lanes into the first lane 2a can be estimated accurately.

(2) The position prediction unit 36c may predict the front-rear direction position of the host vehicle 1 at the time point t1 where the absolute value vr1 of the relative speed is at or below the speed threshold value Tv. The position prediction unit 36c and the intention estimation unit 36b may estimate that the adjacent vehicle 4 is likely to change lanes into the first lane 2a when the front-rear direction position of the adjacent vehicle 4 is located in the range in front of the front-rear direction position of the host vehicle 1 and behind the front-rear direction position of the first preceding vehicle 3 at the time point t1 where the absolute value vr1 of the relative speed is at or below the speed threshold value Tv.

When the adjacent vehicle 4 changes lanes into the first lane 2a while matching the vehicle speed of the adjacent vehicle 4 to the vehicle speed of the first preceding vehicle 3, the adjacent vehicle 4 is considered to change lanes into the range behind the first preceding vehicle 3 and in front of the host vehicle 1.

By estimating whether or not the front-rear direction position of the adjacent vehicle 4 is adjusted to a position more rearward than the front-rear direction position of the first preceding vehicle 3 and more forward than the front-rear direction position of the host vehicle 1, the likelihood of the adjacent vehicle 4 to change lanes into the first lane 2a can be estimated accurately.

(3) The range in front of the front-rear direction position of the host vehicle 1 and behind the front-rear direction position of the first preceding vehicle 3 may be the range from the position more forward by the first predetermined distance L1 than the front-rear direction position of the host vehicle 1 to the position more rearward by the second predetermined distance L2 than the front-rear direction position of the first preceding vehicle 3.

This allows for accurate estimation of the likelihood that the adjacent vehicle 4 will change lanes into the first lane 2a while maintaining a spacing between the adjacent vehicle 4 and the host vehicle 1 and a spacing between the adjacent vehicle 4 and the first preceding vehicle 3.

(4) The second predetermined distance L2 may be set shorter than the first predetermined distance L1.

When the adjacent vehicle 4 changes lanes into the range in front of the host vehicle 1 and behind the first preceding vehicle 3 in the first lane 2a, it is easier for the adjacent vehicle 4 to maintain the inter-vehicle distance when the adjacent vehicle 4 enters the first lane 2a at a position closer to the first preceding vehicle 3 located forward in the front-rear direction than to the host vehicle 1 located rearward in the front-rear direction. Therefore, the adjacent vehicle 4 is considered to change lanes to a position closer to the first preceding vehicle 3 than to the host vehicle 1.

Setting the second predetermined distance L2 shorter than the first predetermined distance L1 allows for accurate estimation of the likelihood that the adjacent vehicle 4 will change lanes into the range in front of the host vehicle 1 and behind the first preceding vehicle 3.

(5) For the same reason, when the front-rear direction position of the adjacent vehicle 4 at the time point t1 where the absolute value vr1 of the relative speed is at or below the speed threshold value Tv is closer to the front-rear direction position of the first preceding vehicle 3 than to the front-rear direction position of the host vehicle 1, the position prediction unit 36c and the intention estimation unit 36b may estimate that the adjacent vehicle 4 is likely to change lanes into the first lane 2a.

This allows for accurate estimation of the likelihood that the adjacent vehicle 4 will change lanes into the range in front of the host vehicle 1 and behind the first preceding vehicle 3.

Third Embodiment (Configuration)

Next, a third embodiment is described. The vehicle behavior estimation unit 36 of the third embodiment determines whether or not the adjacent vehicle 4 is trying to change lanes between the host vehicle 1 and the first preceding vehicle 3 while avoiding an inadvertent approach to the host vehicle 1 or the first preceding vehicle 3, in addition to the above conditions A and B. Note that the inadvertent approach means an approach to the extent that the occupant feels uncomfortable, and is hereinafter simply described as approach.

Figure 10A:
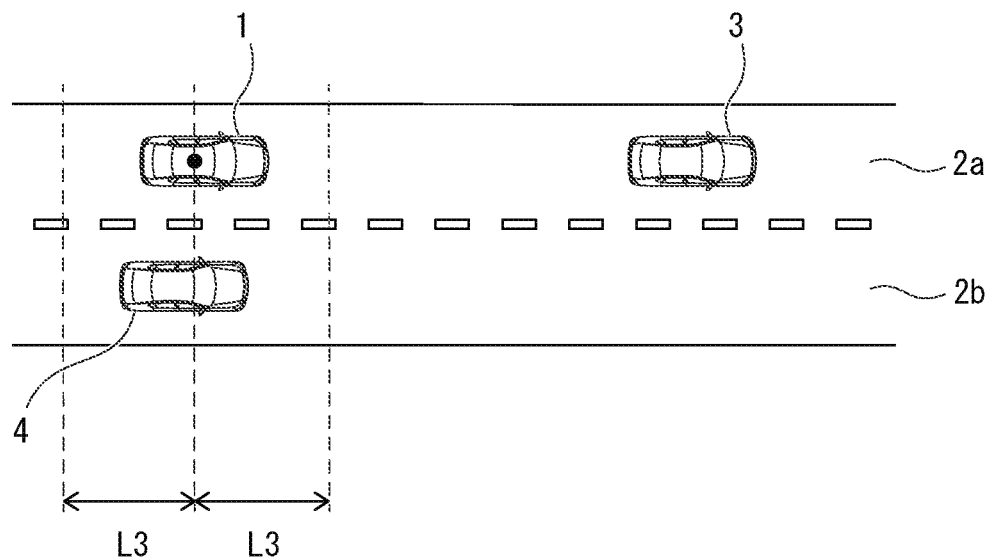
FIG. 10A is an illustrative diagram of an example of a vehicle behavior estimation method of a third embodiment.

Reference is made to FIG. 10A. The vehicle behavior estimation unit 36 of the third embodiment detects a front-rear direction position of the adjacent vehicle 4 at a time point where the adjacent vehicle 4 starts a speed adjustment for changing lanes. The time point t0 when the decrease in the absolute value vr1 of the relative speed between the adjacent vehicle 4 and the first preceding vehicle 3 starts to be detected is used as the time point where the speed adjustment is started.

In an example of FIG. 10A, at the time point t0, the front-rear direction position of the adjacent vehicle 4 is within a range of a predetermined distance L3 from the front-rear direction position of the host vehicle 1, and is close to the front-rear direction position of the host vehicle 1. Accordingly, because there is a risk of an approach, the lane cannot be changed.

However, when the above conditions A and B1 (or B2) are satisfied, it is estimated that the adjacent vehicle 4 is adjusting the speed thereof so as to be able to change lanes without approaching the host vehicle 1 by the subsequent time point t1.

Figure 10B:
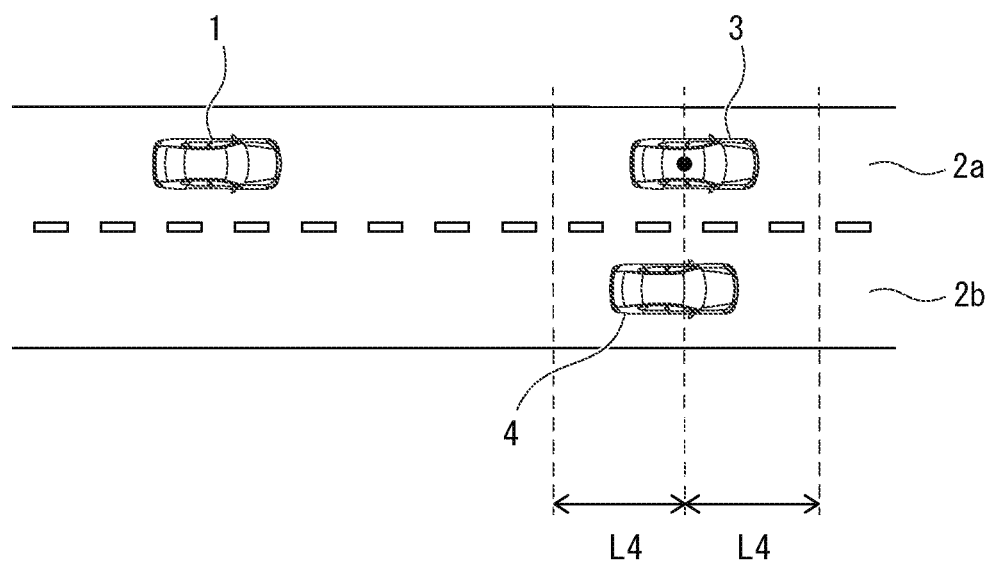
FIG. 10B is an illustrative diagram of an example of the vehicle behavior estimation method of the third embodiment.

In an example of FIG. 10B, at the time point t0, the front-rear direction position of the adjacent vehicle 4 is within a range of a predetermined distance L4 from the front-rear direction position of the first preceding vehicle 3, and is close to the front-rear direction position of the first preceding vehicle 3. Accordingly, because there is a risk of an approach, the lane cannot be changed.

However, when the above conditions A and B (or B1 or B2) are satisfied, it is estimated that the adjacent vehicle 4 is adjusting the speed thereof so as to be able to change lanes without approaching the first preceding vehicle 3 by the subsequent time point t1.

Therefore, the vehicle behavior estimation unit 36 of the third embodiment determines whether or not the front-rear direction position of the adjacent vehicle 4 at the time point t0 when the decrease in the absolute value vr1 of the relative speed starts to be detected is within the range of the predetermined distance L3 from the front-rear direction position of the host vehicle 1 or within the range of the predetermined distance L4 from the front-rear direction position of the first preceding vehicle 3. The predetermined distance L3 may be the same as or different from the first predetermined distance L1 of the first modification of the second embodiment. The predetermined distance L4 may be the same as or different from the second distance L2 of the first modification of the second embodiment.

When the above conditions A and B are satisfied and the front-rear direction position of the adjacent vehicle 4 at the time point t0 is within the range of the predetermined distance L3 from the front-rear direction position of the host vehicle 1 or within the range of the predetermined distance L4 from the front-rear direction position of the first preceding vehicle 3, the vehicle behavior estimation unit 36 estimates that the adjacent vehicle 4 is likely to change lanes into the first lane 2a. For example, the vehicle behavior estimation unit 36 estimates that the adjacent vehicle 4 will change lanes into a range behind the first preceding vehicle 3 and in front of the host vehicle 1.

On the contrary, when at least one of the above condition A or B is not satisfied or the front-rear direction position of the adjacent vehicle 4 at the time point t0 is neither within the range of the predetermined distance L3 from the front-rear direction position of the host vehicle 1 nor within the range of the predetermined distance L4 from the front-rear direction position of the first preceding vehicle 3, the vehicle behavior estimation unit 36 does not estimate that the adjacent vehicle 4 is likely to change lanes into the first lane 2a.

Figure 11:
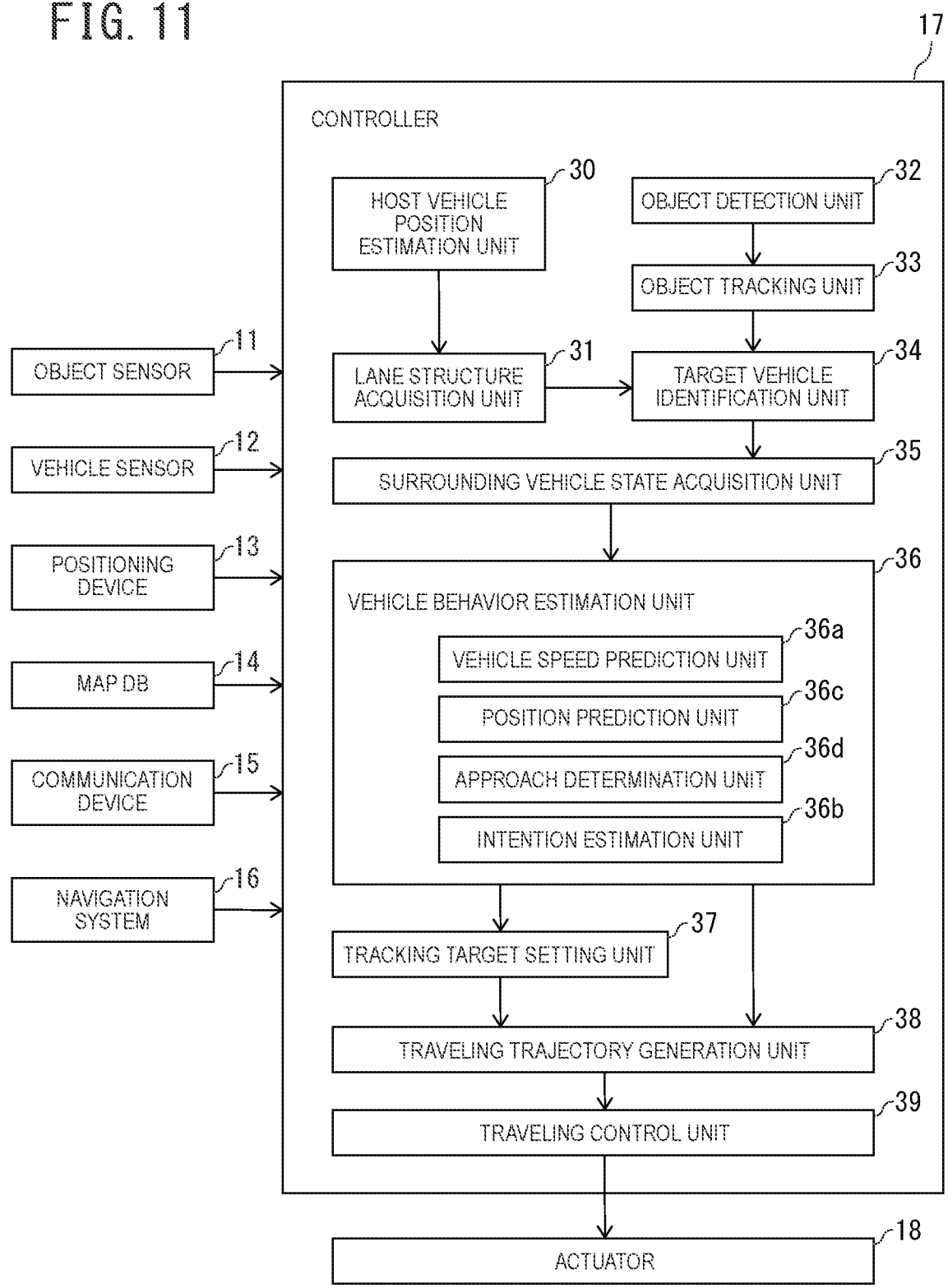
FIG. 11 is a diagram illustrating an example of a functional configuration of the controller 17 of the third embodiment.

Functions of the controller 17 of the third embodiment are described in detail with reference to FIG. 11. The controller 17 of the third embodiment has the same configuration as that of the second embodiment. Among components of the controller 17 of the third embodiment, the same components as those of the second embodiment are denoted by the same reference signs.

The vehicle behavior estimation unit 36 of the third embodiment includes an approach determination unit 36d.

The approach determination unit 36d acquires the front-rear direction positions of the adjacent vehicle 4 and the first preceding vehicle 3 at the time point t0 when the decrease in the absolute value vr1 of the relative speed between the adjacent vehicle 4 and the first preceding vehicle 3 starts to be detected from the object detection unit 32.

The approach determination unit 36d determines whether the following condition C for estimating the likelihood of the adjacent vehicle 4 to change lanes into the first lane 2a is satisfied or not.

(Condition C): The front-rear direction position of the adjacent vehicle 4 at the time point t0 is within the range of the predetermined distance L3 from the front-rear direction position of the host vehicle 1 or within the range of the predetermined distance L4 from the front-rear direction position of the first preceding vehicle 3.

The intention estimation unit 36b estimates whether or not the adjacent vehicle 4 is likely to change lanes into the first lane 2a on the basis of the determination result of the vehicle speed prediction unit 36a, the determination result of the position prediction unit 36c, and the determination result of the approach determination unit 36d.

When all of the conditions A, B, and C are satisfied, the intention estimation unit 36b estimates that the adjacent vehicle 4 is likely to change lanes into the first lane 2a.

On the other hand, when at least one of the condition A, B, or C is not satisfied, the intention estimation unit 36b does not estimate that the adjacent vehicle 4 is likely to change lanes into the first lane 2a.

The other function of the intention estimation unit 36b is the same as that of the first embodiment.

(Operation)

Figure 12:
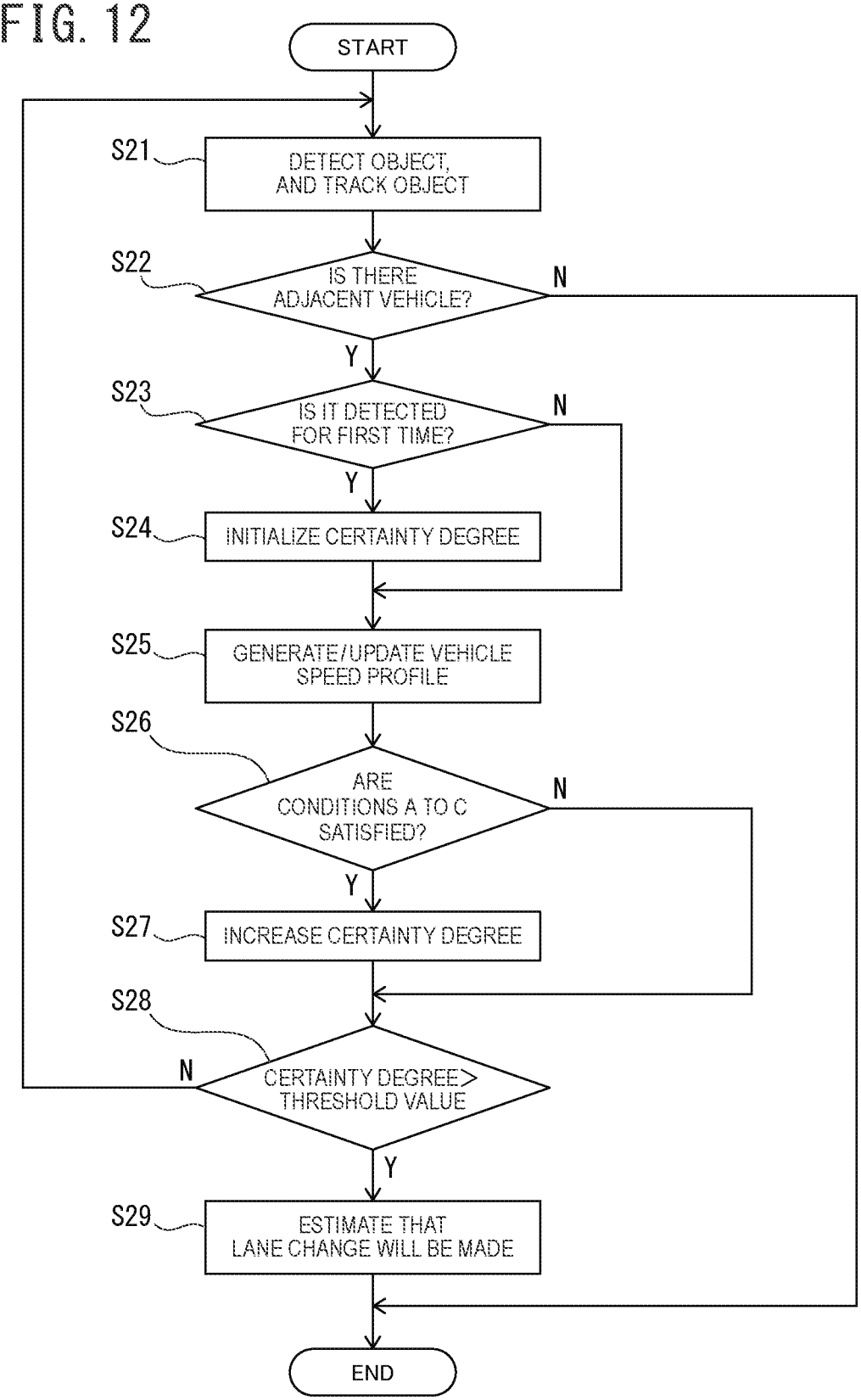
FIG. 12 is a flowchart of an example of the vehicle behavior estimation method of the third embodiment.

Next, an example of the vehicle behavior estimation method by the traveling assistance device 10 according to the third embodiment is described with reference to FIG. 12.

Processing of steps S21 to S25 is the same as that of steps S1 to S5 of the first embodiment described with reference to FIG. 4.

At step S26, the vehicle speed prediction unit 36a determines whether the above condition A is satisfied or not. Additionally, the position prediction unit 36c determines whether the above condition B is satisfied or not. The approach determination unit 36d determines whether the above condition C is satisfied or not.

The intention estimation unit 36b determines whether all of the conditions A, B, and C are satisfied or not. When all of the conditions A, B, and C are satisfied (step S26: Y), processing proceeds to step S27. When at least one of the condition A, B, or C is not satisfied (step S26: N), processing proceeds to step S28.

Processing of steps S27 to S29 is the same as that of steps S7 to S9 of the first embodiment described with reference to FIG. 4.

Effects of Third Embodiment

When the front-rear direction position of the adjacent vehicle 4 at the time point t0 when the decrease in the absolute value vr1 of the relative speed starts to be detected is within the range of the predetermined distance L3 from the front-rear direction position of the host vehicle 1 or within the range of the predetermined distance L4 from the front-rear direction position of the first preceding vehicle 3, the approach determination unit 36d and the intention estimation unit 36b may estimate that the adjacent vehicle 4 is likely to change lanes into the first lane 2a.

This allows for accurate estimation of the likelihood that the adjacent vehicle 4 will change lanes between the host vehicle 1 and the first preceding vehicle 3 while avoiding an approach to the host vehicle 1 or the first preceding vehicle 3.

Fourth Embodiment (Configuration)

Next, a fourth embodiment is described. The vehicle behavior estimation unit 36 of the fourth embodiment determines whether or not the adjacent vehicle 4 is more likely to change lanes into the first lane 2a on the basis of information on a vehicle preceding the adjacent vehicle 4.

Figure 13A:
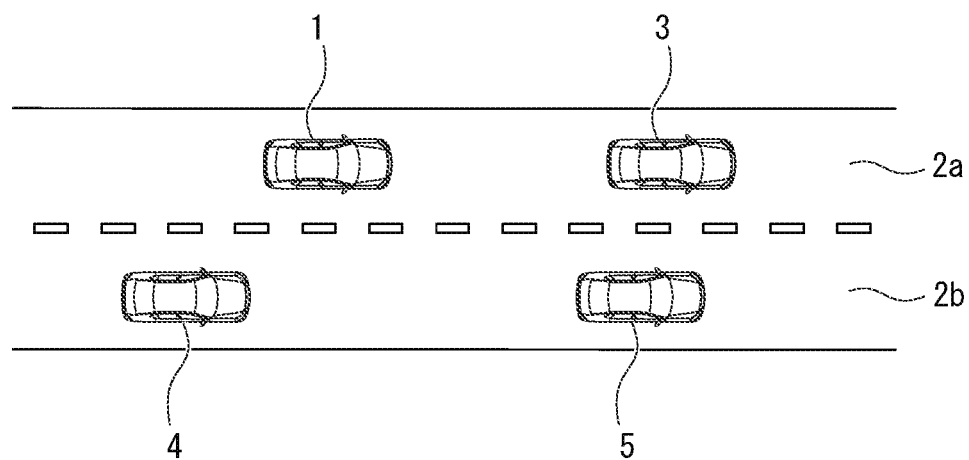
FIG. 13A is an illustrative diagram of a positional relationship between the host vehicle, the first preceding vehicle, the adjacent vehicle, and a second preceding vehicle.

Now, as illustrated in FIG. 13A, assume that there is a second preceding vehicle 5 traveling in front of the adjacent vehicle 4 in the second lane 2b.

Figure 13B:
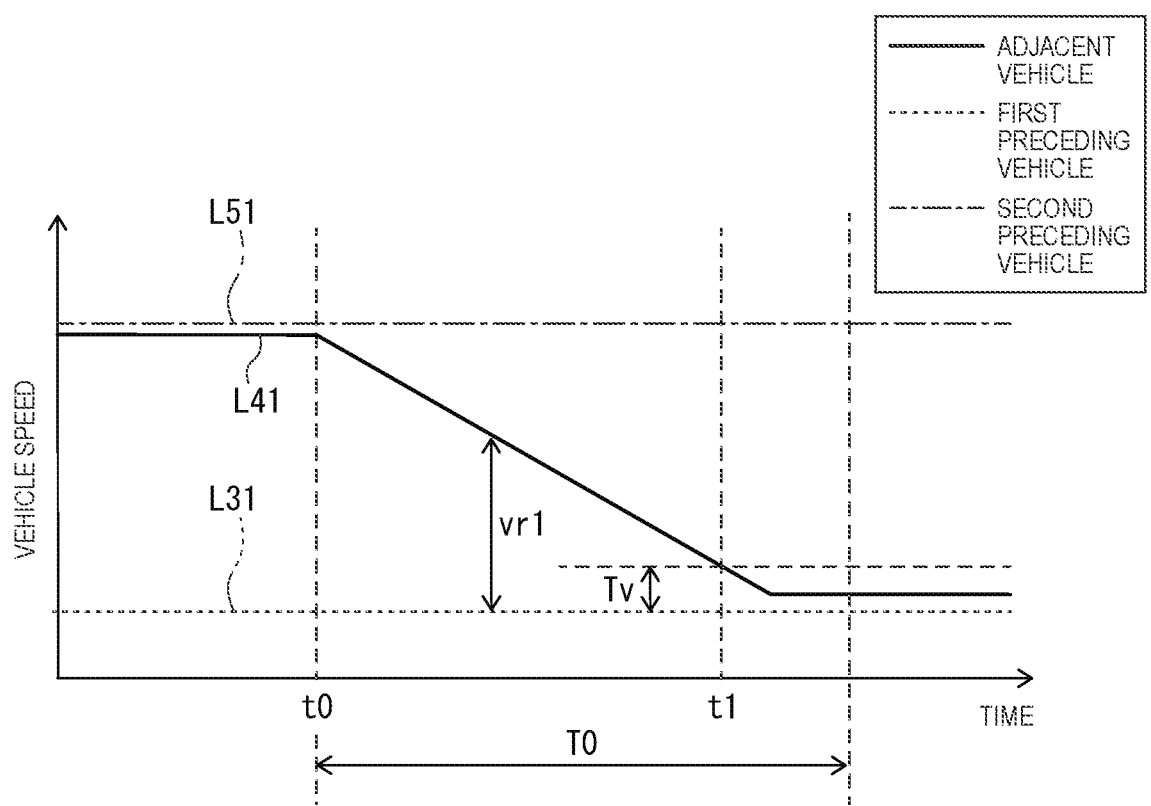
FIG. 13B is an illustrative diagram of an example of a vehicle behavior estimation method of a fourth embodiment.

Reference is made to FIG. 13B. The adjacent vehicle 4 starts to decelerate at the time point t0, whereas the second preceding vehicle 5 is traveling at a constant speed even after the time point t0. Therefore, a speed difference between the adjacent vehicle 4 and the second preceding vehicle 5 increases, as a result of which an inter-vehicle distance between the adjacent vehicle 4 and the second preceding vehicle 5 also increases.

Additionally, the absolute value vr1 of the relative speed between the vehicle speed of the adjacent vehicle 4 and the vehicle speed of the first preceding vehicle 3 decreases.

In such a case, it can be estimated that the adjacent vehicle 4 is highly likely to stop following the second preceding vehicle 5 and change lanes behind the first preceding vehicle 3.

Therefore, in addition to estimating whether or not the adjacent vehicle 4 is likely to change lanes into the first lane 2a on the basis of the conditions A, B, and C, the vehicle behavior estimation unit 36 of the fourth embodiment estimates that the adjacent vehicle 4 is more likely to change lanes into the first lane 2a when the second preceding vehicle 5 is determined to be faster than the adjacent vehicle 4, compared to when the second preceding vehicle 5 is not determined to be faster than the adjacent vehicle 4.

Figure 14:
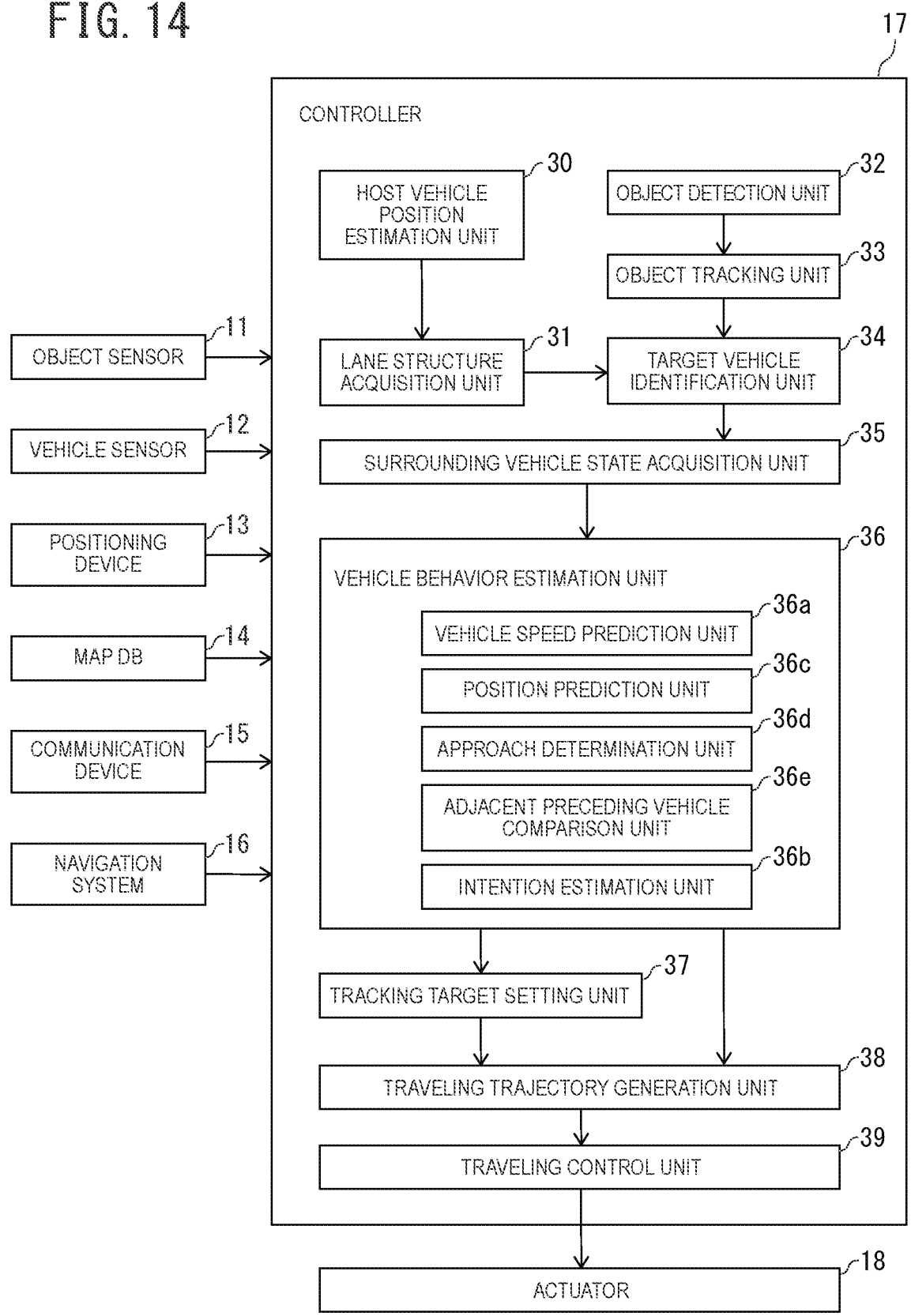
FIG. 14 is a diagram illustrating an example of a functional configuration of the controller 17 of the fourth embodiment.

Functions of the controller 17 of the fourth embodiment are described in detail with reference to FIG. 14. The controller 17 of the fourth embodiment has the same configuration as that of the third embodiment. Among components of the controller 17 of the fourth embodiment, the same components as those of the third embodiment are denoted by the same reference signs.

The vehicle behavior estimation unit 36 of the fourth embodiment includes an adjacent preceding vehicle comparison unit 36e.

The target vehicle identification unit 34 identifies the second preceding vehicle 5 on the basis of a lane structure around the host vehicle 1 acquired by the lane structure acquisition unit 31, a result of object detection by the object detection unit 32, and a result of tracking by the object tracking unit 33. Additionally, the surrounding vehicle state acquisition unit 35 generates a speed profile of the second preceding vehicle 5.

When all of the above conditions A, B, and C are satisfied, the adjacent preceding vehicle comparison unit 36e calculates a predicted speed of the adjacent vehicle 4 and a predicted speed of the second preceding vehicle 5 at a time after the time point t0 when the decrease in the absolute value vr1 of the relative speed between the adjacent vehicle 4 and the first preceding vehicle 3 starts to be detected.

The adjacent preceding vehicle comparison unit 36e determines whether the following condition D for estimating whether or not the adjacent vehicle 4 is highly likely to change lanes into the first lane 2a is satisfied or not.

(Condition D): It is predicted that the predicted speed of the second preceding vehicle 5 is higher than the predicted speed of the adjacent vehicle 4 at the time after the time point t0.

When all of the conditions A, B, and C are satisfied, the intention estimation unit 36b estimates that the adjacent vehicle 4 is likely to change lanes into the first lane 2a. As a result, the intention estimation unit 36b increases the certainty degree by a predetermined step amount (for example, the certainty degree is counted up).

Additionally, when the condition D is satisfied, the intention estimation unit 36b estimates that the adjacent vehicle 4 is more likely to change lanes into the first lane 2a. In this case, the intention estimation unit 36b further adds an additional point to the certainty degree.

Therefore, when the condition D is satisfied, the certainty degree is higher than when the condition D is not satisfied. In other words, the intention estimation unit 36b estimates that the lane change is more likely to occur.

(Operation)

Figure 15:
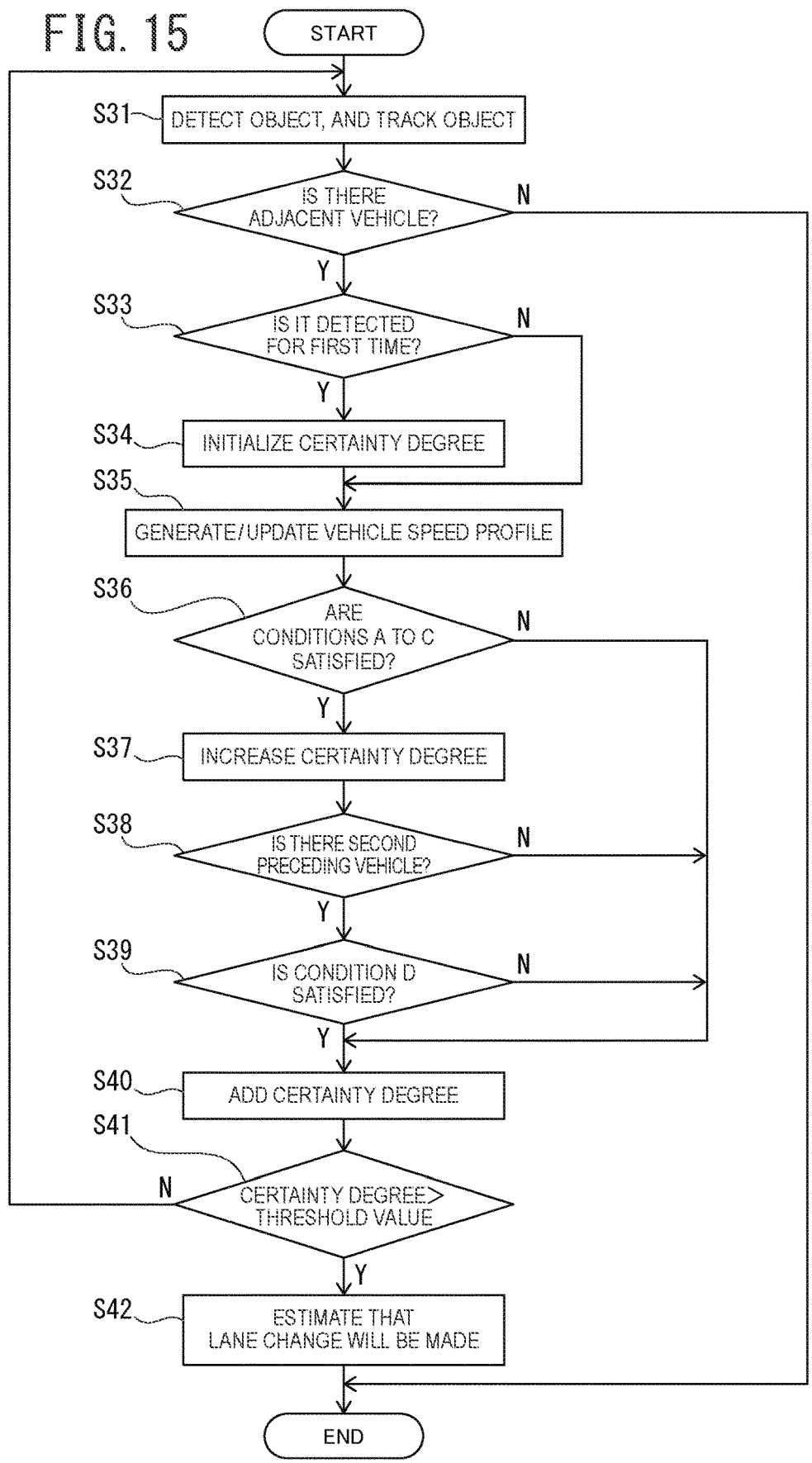
FIG. 15 is a flowchart of an example of the vehicle behavior estimation method of the fourth embodiment.

Next, an example of the vehicle behavior estimation method by the traveling assistance device 10 according to the fourth embodiment is described with reference to FIG. 15.

Processing of steps S31 to S37 is the same as that of steps S21 to S27 of the third embodiment described with reference to FIG. 12. After step S37, processing proceeds to step S38.

At step S38, the adjacent preceding vehicle comparison unit 36e determines whether the second preceding vehicle 5 is present or not. When the second preceding vehicle 5 is present (step S38: Y), processing proceeds to step S39. When the second preceding vehicle 5 is not present (step S38: N), processing proceeds to step S41.

At step S39, the adjacent preceding vehicle comparison unit 36e determines whether the condition D is satisfied or not. When the condition D is satisfied (step S39: Y), processing proceeds to step S40. When the condition D is not satisfied (step S39: N), processing proceeds to step S41.

At step S40, the intention estimation unit 36b further adds an additional point to the certainty degree. Then, processing proceeds to step S41.

Processing of steps S41 and S42 is the same as that of steps S28 and S29 of the third embodiment described with reference to FIG. 12.

Modifications

Under the condition D, instead of determining whether or not it is predicted that the predicted speed of the second preceding vehicle 5 is higher than the predicted speed of the adjacent vehicle 4, it may be determined whether or not the speed difference between the predicted speed of the adjacent vehicle 4 and the predicted speed of the second preceding vehicle 5 tends to increase.

Additionally, under the condition D, instead of determining whether or not it is predicted that the predicted speed of the second preceding vehicle 5 is higher than the predicted speed of the adjacent vehicle 4, it may be determined whether or not the speed difference between the predicted speed of the adjacent vehicle 4 and the predicted speed of the second preceding vehicle 5 is at or above a threshold value.

Note that, at the time after the time point t0, the absolute value vr1 of the relative speed between the adjacent vehicle 4 and the first preceding vehicle 3 decreases, and the speed difference between the adjacent vehicle 4 and the first preceding vehicle 3 becomes small.

Accordingly, under the condition D, it may be determined whether or not it is predicted that the predicted speed of the second preceding vehicle 5 is higher than the predicted speed of the first preceding vehicle 3 instead of the predicted speed of the adjacent vehicle 4.

Additionally, even when the second preceding vehicle 5 is traveling far in front of the adjacent vehicle 4, and the adjacent vehicle 4 adjusts the vehicle speed thereof to match the first preceding vehicle 3 even though there is a sufficient space in front of the adjacent vehicle 4, it can be estimated that the adjacent vehicle 4 is highly likely to change lanes behind the first preceding vehicle 3 in the first lane 2a.

Therefore, under the condition D, it may be determined whether or not it is predicted that an inter-vehicle distance between the adjacent vehicle 4 and the second preceding vehicle 5 is at or above a distance threshold value instead of determining whether or not it is predicted that the predicted speed of the second preceding vehicle 5 is higher than the predicted speed of the adjacent vehicle 4 at the time after the time point t0.

Effects of Fourth Embodiment (1) The object detection unit 32 detects the speed of the second preceding vehicle 5 traveling in front of the adjacent vehicle 4 in the second lane 2b. When the second preceding vehicle 5 is determined to be faster than the adjacent vehicle 4, the adjacent preceding vehicle comparison unit 36e and the intention estimation unit 36b may estimate that the adjacent vehicle 4 is more likely to change lanes into the first lane 2a than when the second preceding vehicle 5 is not determined to be faster than the adjacent vehicle 4.

As a result, when the vehicle speed of the second preceding vehicle 5 is high and the distance from the adjacent vehicle 4 is widening, it can be estimated that the adjacent vehicle 4 is adjusting the vehicle speed thereof to match the first preceding vehicle 3, and the adjacent vehicle 4 is highly likely to change lanes behind the first preceding vehicle 3.

(2) The object detection unit 32 detects the position of the second preceding vehicle 5 traveling in front of the adjacent vehicle 4 in the second lane 2b. When the inter-vehicle distance between the adjacent vehicle 4 and the second preceding vehicle 5 is at or above the distance threshold value, the adjacent preceding vehicle comparison unit 36e and the intention estimation unit 36b may estimate that the adjacent vehicle 4 is more likely to change lanes into the first lane 2a than when the inter-vehicle distance is below the distance threshold value.

As a result, when the adjacent vehicle 4 adjusts the vehicle speed thereof to match the first preceding vehicle 3 even though there is a sufficient space in front of the adjacent vehicle 4, it can be estimated that the adjacent vehicle 4 is highly likely to change lanes behind the first preceding vehicle 3.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Host vehicle
2a: First lane
2b: Second lane
3: First preceding vehicle
4: Adjacent vehicle
5: Second preceding vehicle
10: Traveling assistance device
11: Object sensor
12: Vehicle sensor
13: Positioning device
14: Map database
15: Communication device
16: Navigation system
17: Controller
18: Actuator
19: Output device
21: Processor
22: Storage device
30: Host vehicle position estimation unit
31: Lane structure acquisition unit
32: Object detection unit
33: Object tracking unit
34: Target vehicle identification unit
35: Surrounding vehicle state acquisition unit
36: Vehicle behavior estimation unit
36a: Vehicle speed prediction unit
36b: Intention estimation unit
36c: Position prediction unit
36d: Approach determination unit
36e: Adjacent preceding vehicle comparison unit
37: Tracking target setting unit
38: Traveling trajectory generation unit
39: Traveling control unit

The invention claimed is:

1. A vehicle behavior estimation method comprising:
   detecting a speed of a first preceding vehicle traveling in front of a host vehicle in a first lane where the host vehicle is traveling;
   detecting a speed of an adjacent vehicle traveling in a second lane adjacent to the first lane;
   calculating a relative speed between the first preceding vehicle and the adjacent vehicle;
   predicting whether or not an absolute value of the relative speed will be at or below a speed threshold value within a predetermined time from a point time when a decrease in the absolute value of the relative speed starts to be detected;
   estimating that the adjacent vehicle is likely to change lanes into the first lane when the absolute value of the relative speed is predicted to be at or below the speed threshold value within the predetermined time; and
   controlling the host vehicle based on estimating that the adjacent vehicle is likely to change lanes into the first lane when the absolute value of the relative speed is predicted to be at or below the speed threshold value within the predetermined time.

2. The vehicle behavior estimation method according to claim 1, further comprising:
   detecting positions of the adjacent vehicle and the first preceding vehicle;
   predicting a front-rear direction position of the adjacent vehicle and a front-rear direction position of the first preceding vehicle at a time point where the absolute value of the relative speed becomes at or below the speed threshold value when the absolute value of the relative speed is predicted to be at or below the speed threshold value within the predetermined time from the time point where the decrease in the absolute value of the relative speed starts to be detected; and
   estimating that the adjacent vehicle is likely to change lanes into the first lane when the front-rear direction position of the adjacent vehicle is located behind the front-rear direction position of the first preceding vehicle at the time point where the absolute value of the relative speed becomes at or below the speed threshold value.

3. The vehicle behavior estimation method according to claim 2, further comprising:
   predicting a front-rear direction position of the host vehicle at the time point where the absolute value of the relative speed becomes at or below the speed threshold value; and
   estimating that the adjacent vehicle is likely to change lanes into the first lane when the front-rear direction position of the adjacent vehicle is located in a range from in front of the front-rear direction position of the host vehicle to behind the front-rear direction position of the first preceding vehicle at the time point where the absolute value of the relative speed becomes at or below the speed threshold value.

4. The vehicle behavior estimation method according to claim 3, wherein the range from in front of the front-rear direction position of the host vehicle to behind the front-rear direction position of the first preceding vehicle is a range from a position more forward by a first predetermined distance than the front-rear direction position of the host vehicle to a position more rearward by a second predetermined distance than the front-rear direction position of the first preceding vehicle.

5. The vehicle behavior estimation method according to claim 4, wherein the second predetermined distance is shorter than the first predetermined distance.

6. The vehicle behavior estimation method according to claim 3, further comprising:
estimating that the adjacent vehicle is likely to change lanes into the first lane when the front-rear direction position of the adjacent vehicle at the time point where the absolute value of the relative speed becomes at or below the speed threshold value is closer to the front-rear direction position of the first preceding vehicle than to the front-rear direction position of the host vehicle.

7. The vehicle behavior estimation method according to claim 2, further comprising:
estimating that the adjacent vehicle is likely to change lanes into the first lane when the front-rear direction position of the adjacent vehicle at the time point where the decrease in the absolute value of the relative speed starts to be detected is within a first distance range from the front-rear direction position of the host vehicle or within a second distance range from the front-rear direction position of the first preceding vehicle.

8. The vehicle behavior estimation method according to claim 1, further comprising:
detecting a speed of a second preceding vehicle traveling in front of the adjacent vehicle in the second lane; and
when the second preceding vehicle is determined to be faster than the adjacent vehicle, estimating that the adjacent vehicle is more likely to change lanes into the first lane than when the second preceding vehicle is not determined to be faster than the adjacent vehicle.

9. The vehicle behavior estimation method according to claim 1, further comprising:
detecting a position of a second preceding vehicle traveling in front of the adjacent vehicle in the second lane; and
when an inter-vehicle distance between the adjacent vehicle and the second preceding vehicle is at or above a distance threshold value, estimating that the adjacent vehicle is more likely to change lanes into the first lane than when the inter-vehicle distance is below the distance threshold value.

10. The vehicle behavior estimation method according to claim 1, further comprising:
calculating a certainty degree by accumulating estimation results obtained by repeatedly estimating a likelihood that the adjacent vehicle will change lanes between the host vehicle and the first preceding vehicle; and
estimating that the adjacent vehicle will change lanes into the first lane when the certainty degree exceeds a threshold value.

11. A vehicle control method comprising, when the vehicle behavior estimation method according to claim 1 determines that the adjacent vehicle is likely to change lanes into the first lane, executing at least one of a vehicle control configured to increase or maintain an inter-vehicle distance between the host vehicle and the first preceding vehicle, a vehicle control configured to reduce or maintain a vehicle speed of the host vehicle, or a vehicle control configured to prohibit acceleration of the host vehicle.

12. A vehicle behavior estimation device comprising:
an object detection sensor configured to detect objects around a host vehicle; and
a controller configured to:
detect a speed of a first preceding vehicle traveling in front of the host vehicle in a first lane where the host vehicle is traveling on a basis of a result of the detection by the object detection sensor;
detect a speed of an adjacent vehicle traveling in a second lane adjacent to the first lane on the basis of the result of the detection by the object detection sensor;
calculate a relative speed between the first preceding vehicle and the adjacent vehicle;
predict whether or not an absolute value of the relative speed will be at or below a speed threshold value within a predetermined time from a time point where a decrease in an absolute value of the relative speed starts to be detected;
estimate that the adjacent vehicle is likely to change lanes into the first lane when the absolute value of the relative speed is predicted to be at or below the speed threshold value within the predetermined time; and
control the host vehicle based on the estimate that the adjacent vehicle is likely to change lanes into the first lane when the absolute value of the relative speed is predicted to be at or below the speed threshold value within the predetermined time.

* * * * *